US010972244B2

(12) United States Patent
Guo

(10) Patent No.: US 10,972,244 B2
(45) Date of Patent: Apr. 6, 2021

(54) METHOD AND APPARATUS FOR LOW-OVERHEAD AND LOW LATENCY MULTI-BEAM OPERATION

(71) Applicant: Samsung Electronics Co., Ltd., Suwon-si (KR)

(72) Inventor: Li Guo, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/523,857

(22) Filed: Jul. 26, 2019

(65) Prior Publication Data

US 2020/0044797 A1 Feb. 6, 2020

Related U.S. Application Data

(60) Provisional application No. 62/713,091, filed on Aug. 1, 2018, provisional application No. 62/715,925, filed
(Continued)

(51) Int. Cl.
*H04L 5/00* (2006.01)
*H04W 72/04* (2009.01)
(Continued)

(52) U.S. Cl.
CPC ........... *H04L 5/005* (2013.01); *H04B 7/0408* (2013.01); *H04W 72/046* (2013.01);
(Continued)

(58) Field of Classification Search
None
See application file for complete search history.

(56) References Cited

U.S. PATENT DOCUMENTS 8,320,267 B2 * 11/2012 Wei ...................... H04L 5/0044
370/252
9,392,639 B2   7/2016 Josiam et al.
(Continued)

FOREIGN PATENT DOCUMENTS

EP          3 567 783 A1    11/2019
KR    10-2014-0107117 A      9/2014
WO       2018/128376 A1      7/2018

OTHER PUBLICATIONS

LG Electronics, "Discussion on non-codebook based transmission for UL", 3GPP TSG RAN WG1 Meeting 90bis, Oct. 9-13, 2017, 3 pages.
(Continued)

*Primary Examiner* — Anh Ngoc M Nguyen

(57) ABSTRACT

Systems, devices, and methods for low-overhead and low latency multi-beam operation in an advanced wireless communication system. A method of a user equipment (UE) for a multi-beam operation in a wireless communication system includes: receiving, from a base station (BS), a sounding reference signal (SRS) resource configuration; receiving, from the BS, a triggering message instructing the UE to transmit an SRS; receiving, from the BS, a configuration for a transmission configuration indicator (TCI) state that includes an identification (ID) indicating the SRS resource configuration; identifying a set of resources to transmit the SRS; and transmitting, to the BS over an uplink channel, the SRS based on the SRS resource configuration with a spatial domain transmission filter. The UE receives a downlink transmission from the BS with a spatial domain receive filter that is determined according to the ID included in the TCI state that is indicated for the downlink transmission.

17 Claims, 14 Drawing Sheets

Related U.S. Application Data on Aug. 8, 2018, provisional application No. 62/717,417, filed on Aug. 10, 2018, provisional application No. 62/723,838, filed on Aug. 28, 2018, provisional application No. 62/723,861, filed on Aug. 28, 2018, provisional application No. 62/750,622, filed on Oct. 25, 2018.

(51) Int. Cl.
 *H04W 72/08* (2009.01)
 *H04B 7/0408* (2017.01)
(52) U.S. Cl.
 CPC ..... *H04W 72/048* (2013.01); *H04W 72/0413* (2013.01); *H04W 72/0446* (2013.01); *H04W 72/085* (2013.01)

(56) References Cited

U.S. PATENT DOCUMENTS

| | | | | |
|---|---|---|---|---|
| 2014/0036809 | A1* | 2/2014 | Xu | H04W 52/325 370/329 |
| 2018/0205440 | A1* | 7/2018 | Enescu | H04B 7/0417 |
| 2018/0206132 | A1 | 7/2018 | Guo et al. | |
| 2020/0235802 | A1* | 7/2020 | Nilsson | H04B 7/088 |

OTHER PUBLICATIONS

Huawei, HiSilicon, "Remaining issues on SRS design", 3GPP TSG RAN WG1 Meeting #92, Feb. 26-Mar. 2, 2018, R1-1801806, 5 pages.

International Search Report dated Nov. 29, 2019 in connection with International Patent Application No. PCT/KR2019/009593, 3 pages.

Written Opinion of the International Searching Authority dated Nov. 29, 2019 in connection with International Patent Application No. PCT/KR2019/009593, 6 pages.

"3rd Generation Partnership Project; Technical Specification Group Radio Access Network; Evolved Universal Terrestrial Radio Access (E-UTRA); Physical channels and modulation (Release 14)", 3GPP TS 36.211 V14.0.0, Sep. 2016, 170 pages.

"3rd Generation Partnership Project; Technical Specification Group Radio Access Network; Evolved Universal Terrestrial Radio Access (E-UTRA); Multiplexing and channel coding (Release 14)", 3GPP TS 36.212 V14.0.0, Sep. 2016, 148 pages.

"3rd Generation Partnership Project; Technical Specification Group Radio Access Network; Evolved Universal Terrestrial Radio Access (E-UTRA); Physical layer procedures (Release 14)", 3GPP TS 36.213 V14.0.0, Sep. 2016, 406 pages.

"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.0.0, Sep. 2016, 96 pages.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.0.0, Sep. 2016, 644 pages.

"3rd Generation Partnership Project; Technical Specification Group Radio Access Network; NR; Physical channels and modulation (Release 15)", 3GPP TS 38.211 V15.0.0, Dec. 2017, 73 pages.

"3rd Generation Partnership Project; Technical Specification Group Radio Access Network; NR; Multiplexing and channel coding (Release 15)", 3GPP TS 38.212 V15.0.0, Dec. 2017, 82 pages.

"3rd Generation Partnership Project; Technical Specification Group Radio Access Network; NR; Physical layer procedures (Release 15)", 3GPP TS 38.213 V15.0.0, Dec. 2017, 56 pages.

"3rd Generation Partnership Project; Technical Specification Group Radio Access Network; NR; Physical layer procedures for data (Release 15)", 3GPP TS 38.214 V15.0.0, Dec. 2017, 71 pages.

"3rd Generation Partnership Project; Technical Specification Group Radio Access Network; NR; Medium Access Control (MAC) protocol specification (Release 15)", 3GPP TS 38.321 V15.0.0, Dec. 2017, 55 pages.

"3rd Generation Partnership Project; Technical Specification Group Radio Access Network; NR; Radio Resource Control (RRC) protocol specification (Release 15)", 3GPP TS 38.331 V15.0.0, Dec. 2017, 188 pages.

\* cited by examiner

METHOD AND APPARATUS FOR LOW-OVERHEAD AND LOW LATENCY MULTI-BEAM OPERATION

CROSS-REFERENCE TO RELATED APPLICATION(S) AND CLAIM OF PRIORITY

The present application claims priority to:
U.S. Provisional Patent Application Ser. No. 62/713,091, filed on Aug. 1, 2018;
U.S. Provisional Patent Application Ser. No. 62/715,925, filed on Aug. 8, 2018;
U.S. Provisional Patent Application Ser. No. 62/617,417, filed on Aug. 10, 2018;
U.S. Provisional Patent Application Ser. No. 62/723,838 filed on Aug. 28, 2018;
U.S. Provisional Patent Application Ser. No. 62/723,861, filed on Aug. 28, 2018; and
U.S. Provisional Patent Application Ser. No. 62/750,622 filed on Oct. 25, 2018.
The content of the above-identified patent documents is incorporated herein by reference.

TECHNICAL FIELD

The present disclosure relates generally to multi-beam operation. Specifically, the present disclosure relates to low-overhead and low latency multi-beam operation in an advanced wireless communication system.

BACKGROUND

In a wireless communication network, a network access and a radio resource management (RRM) are enabled by physical layer synchronization signals and higher (MAC) layer procedures. In particular, a user equipment (UE) attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra-reliable low latency (URLLC), massive machine type communication (mMTC), each corresponding to a different coverage requirement and frequency bands with different propagation losses is desirable.

SUMMARY

Embodiments of the present disclosure provide methods and apparatuses for multi-beam operation in an advanced wireless communication system.

In one embodiment, a UE for a multi-beam operation in a wireless communication system is provide. The UE comprises a transceiver configured to: receive, from a BS, a SRS resource configuration; and receive, from the BS, a triggering message instructing the UE to transmit an SRS; and receive, from the BS, a configuration for a transmission configuration indicator (TCI) state that includes an ID indicating the SRS resource configuration. The UE further comprises a processor operably connected to the transceiver, the processor configured to identify a set of resources to transmit the SRS, wherein the transceiver is further configured to transmit, to the BS over an uplink channel, the SRS based on the SRS resource configuration with a spatial domain transmission filter.

In another embodiment, a base station (BS) for a multi-beam operation in a wireless communication system is provided. The BS comprises a transceiver configured to: transmit, to a UE, a SRS resource configuration; transmit, to the UE, a triggering message instructing the UE to transmit an SRS; and transmit, to the UE, a configuration for a TCI state that includes an ID indicating the SRS resource configuration; and receive, from the UE over an uplink channel, the SRS based on the SRS resource configuration in which the UE transmits with a spatial domain transmission filter, wherein a set of resources is determined to receiver the SRS from the UE.

In yet another embodiment, a method of a UE for a multi-beam operation in a wireless communication system is provide. The method comprises: receiving, from a BS, a SRS resource configuration; receiving, from the BS, a triggering message instructing the UE to transmit an SRS; receiving, from the BS, a configuration for a TCI state that includes an ID indicating the SRS resource configuration; identifying a set of resources to transmit the SRS; and transmitting, to the BS over an uplink channel, the SRS based on the SRS resource configuration with a spatial domain transmission filter.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
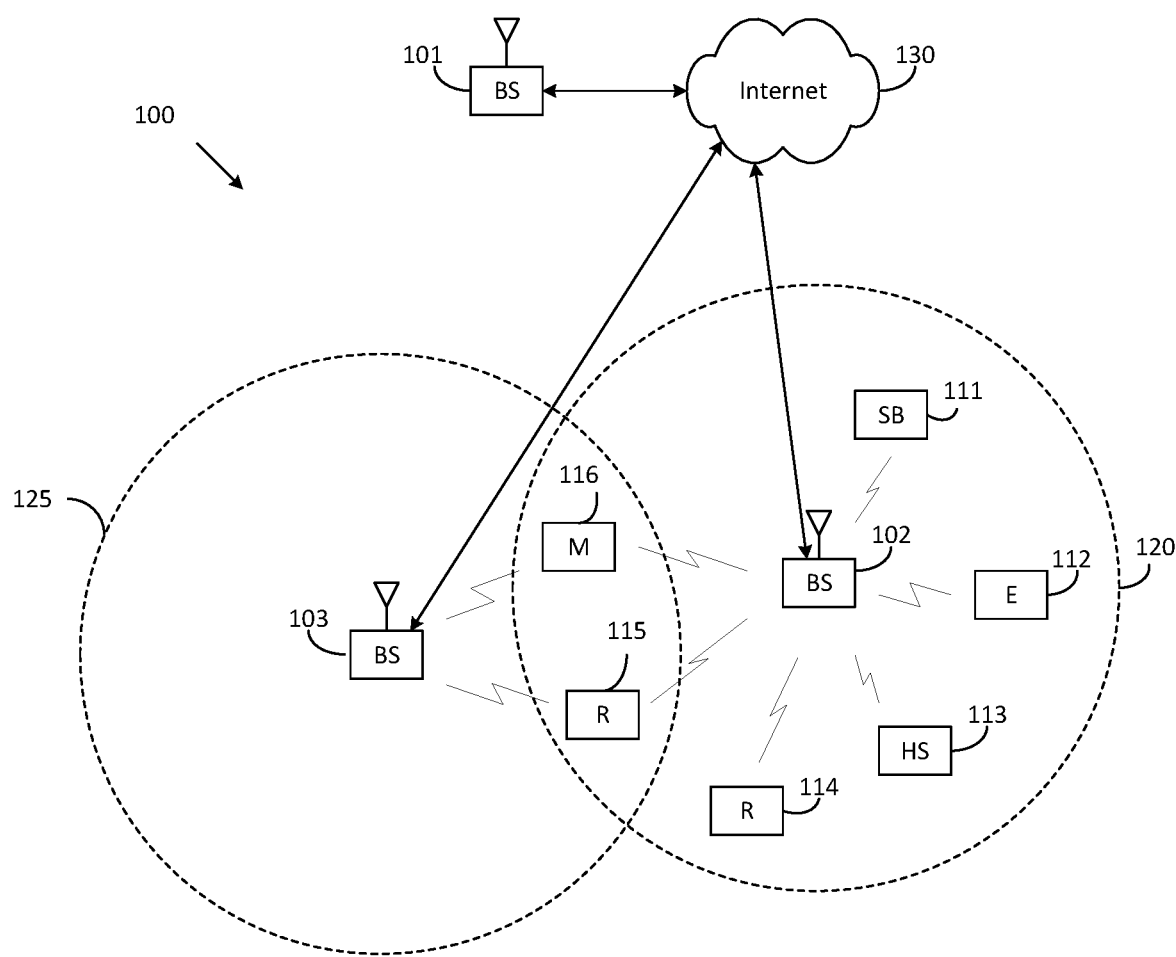
FIG. 1 illustrates an example wireless network according to embodiments of the present disclosure.

FIG. 1 through FIG. 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.0.0, "E-UTRA, Physical channels and modulation;" 3GPP TS 36.212 v14.0.0, "E-UTRA, Multiplexing and Channel coding;" 3GPP TS 36.213 v14.0.0, "E-UTRA, Physical Layer Procedures;" 3GPP TS 36.321 v14.0.0, "E-UTRA, Medium Access Control (MAC) protocol specification;" 3GPP TS 36.331 v14.0.0, "E-UTRA, Radio Resource Control (RRC) Protocol Specification;" 3GPP TS 38.211 v15.0.0, "NR, Physical channels and modulation;" 3GPP TS 38.212 v15.0.0, "NR, Multiplexing and Channel coding;" 3GPP TS 38.213 v15.0.0, "NR, Physical Layer Procedures for Control;" 3GPP TS 38.214 v15.0.0, "NR, Physical Layer Procedures For Data;" 3GPP TS 38.321 v15.0.0, "NR, Medium Access Control (MAC) protocol specification;" and 3GPP TS 38.331 v15.0.0, "NR, Radio Resource Control (RRC) Protocol Specification."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
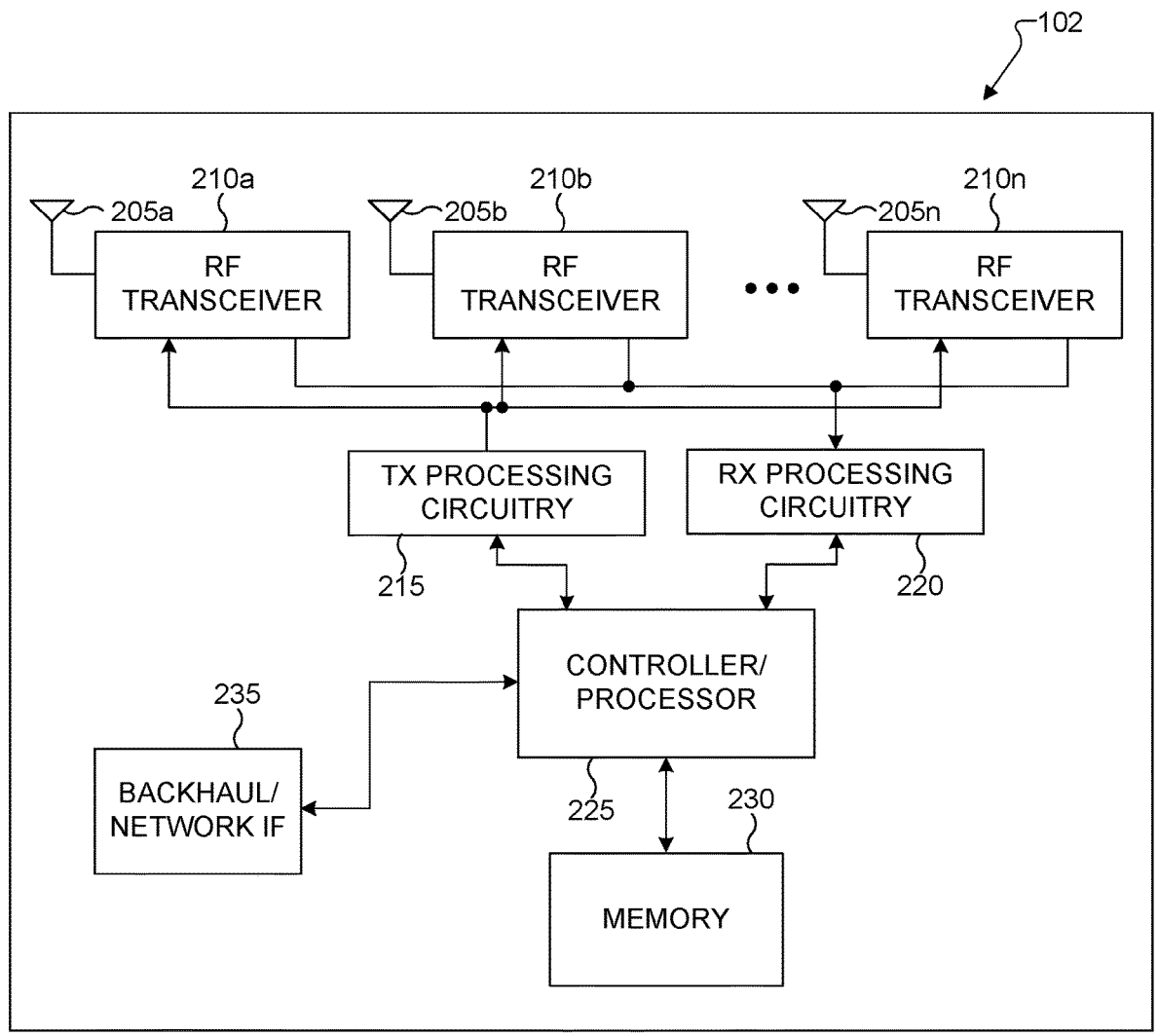
FIG. 2 illustrates an example gNB according to embodiments of the present disclosure.
Figure 3:
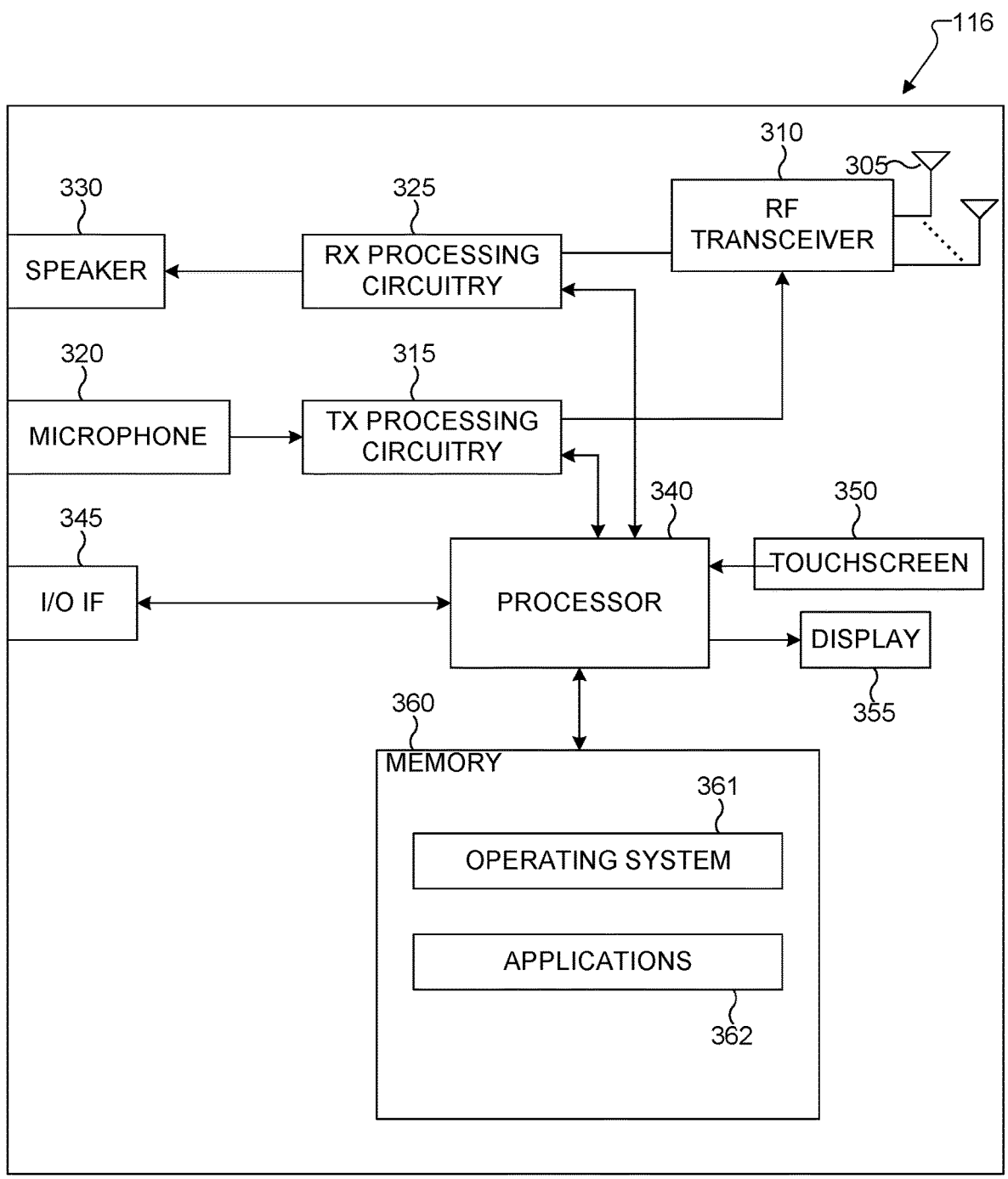
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an gNB 101, an gNB 102, and an gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient multi-beam operation in an advanced wireless communication system. In certain embodiments, and one or more of the gNBs 101-103 includes circuitry, programming, or a combination thereof, for CSI acquisition based on space-frequency compression in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
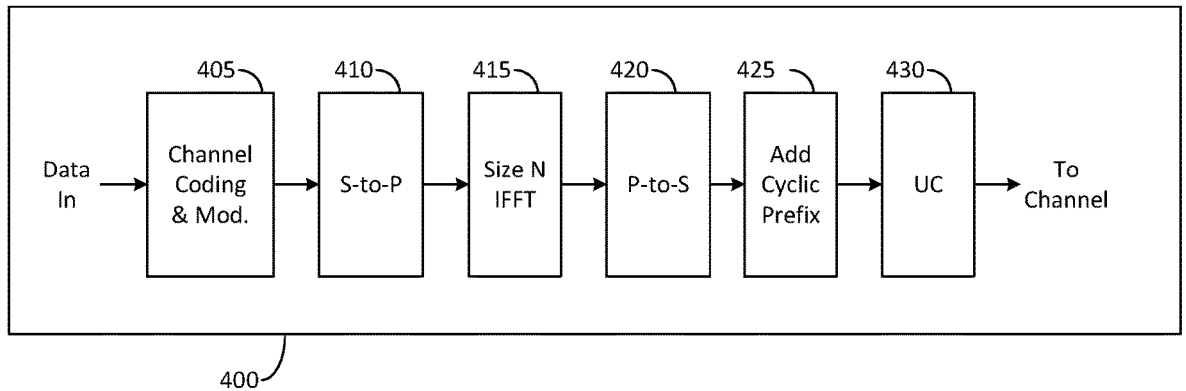
FIG. 4A illustrates a high-level diagram of an orthogonal frequency division multiple access transmit path according to embodiments of the present disclosure.
Figure 4B:
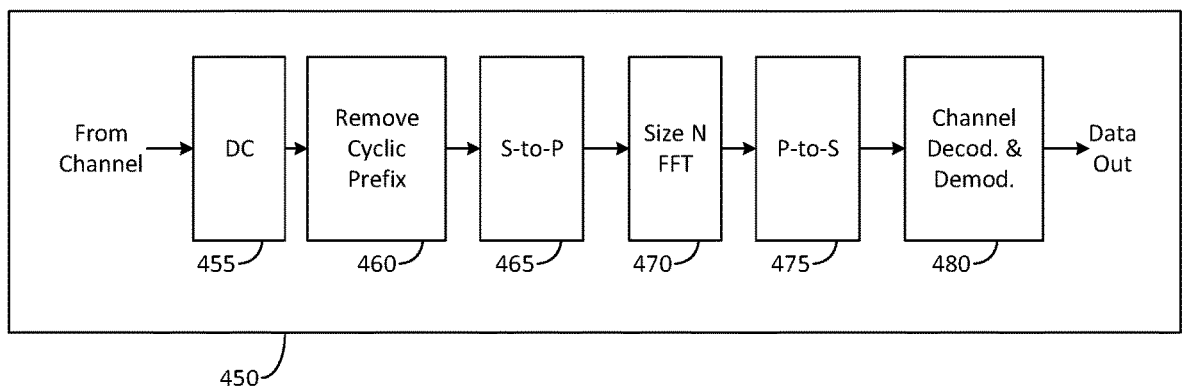
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a physical UL control channel (PUCCH). If a UE needs to transmit data information and UCI in a same UL subframe, the UE may multiplex both in a PUSCH. UCI includes hybrid automatic repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a resource block (RB). A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
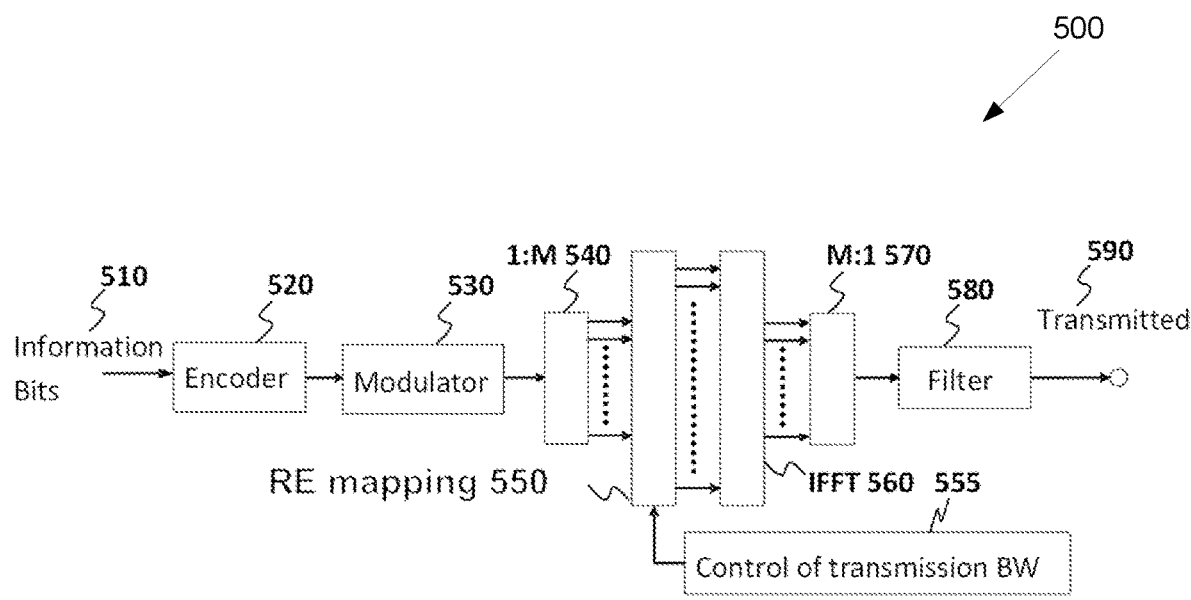
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
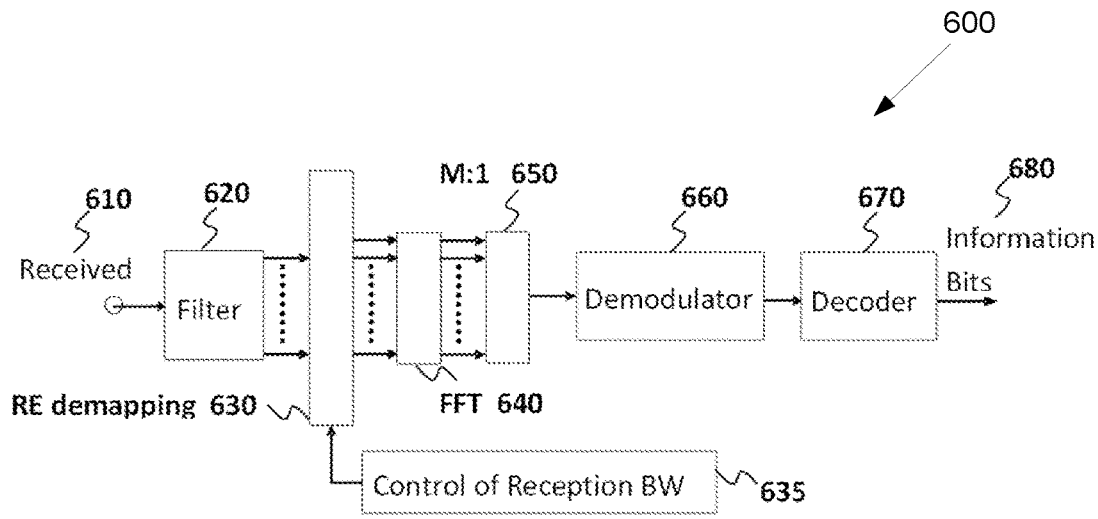
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
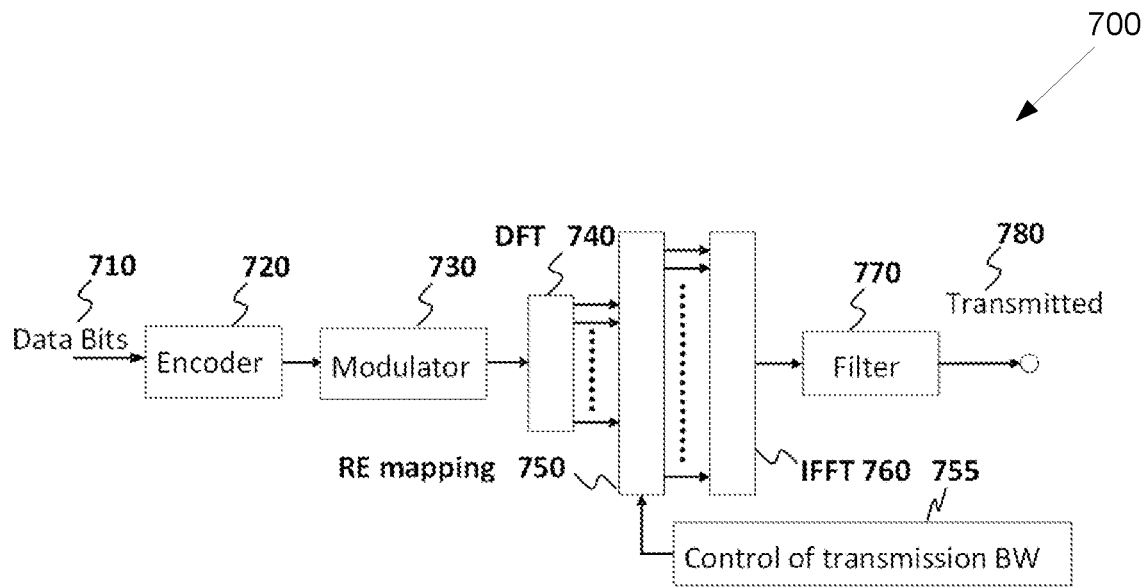
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
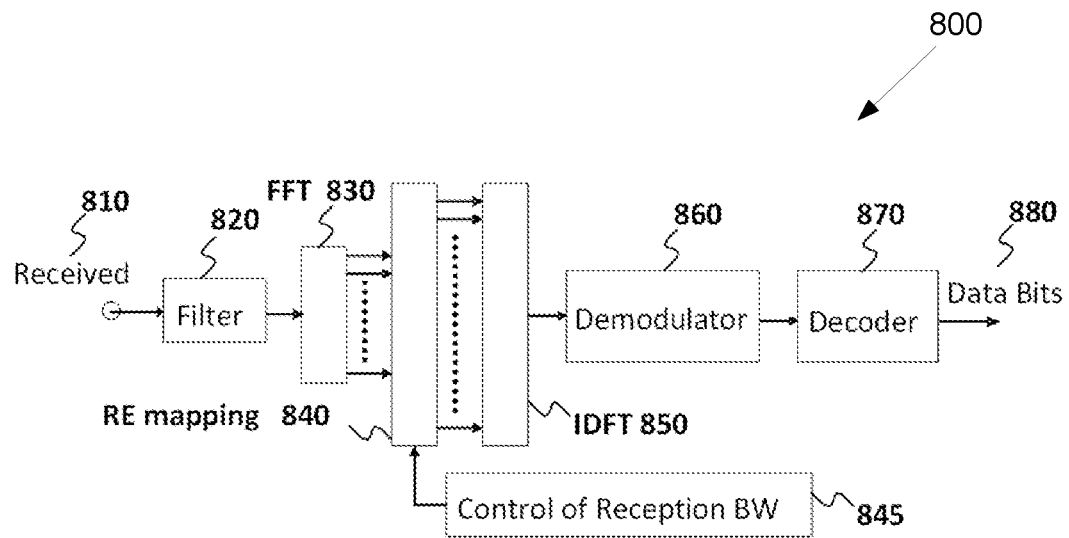
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
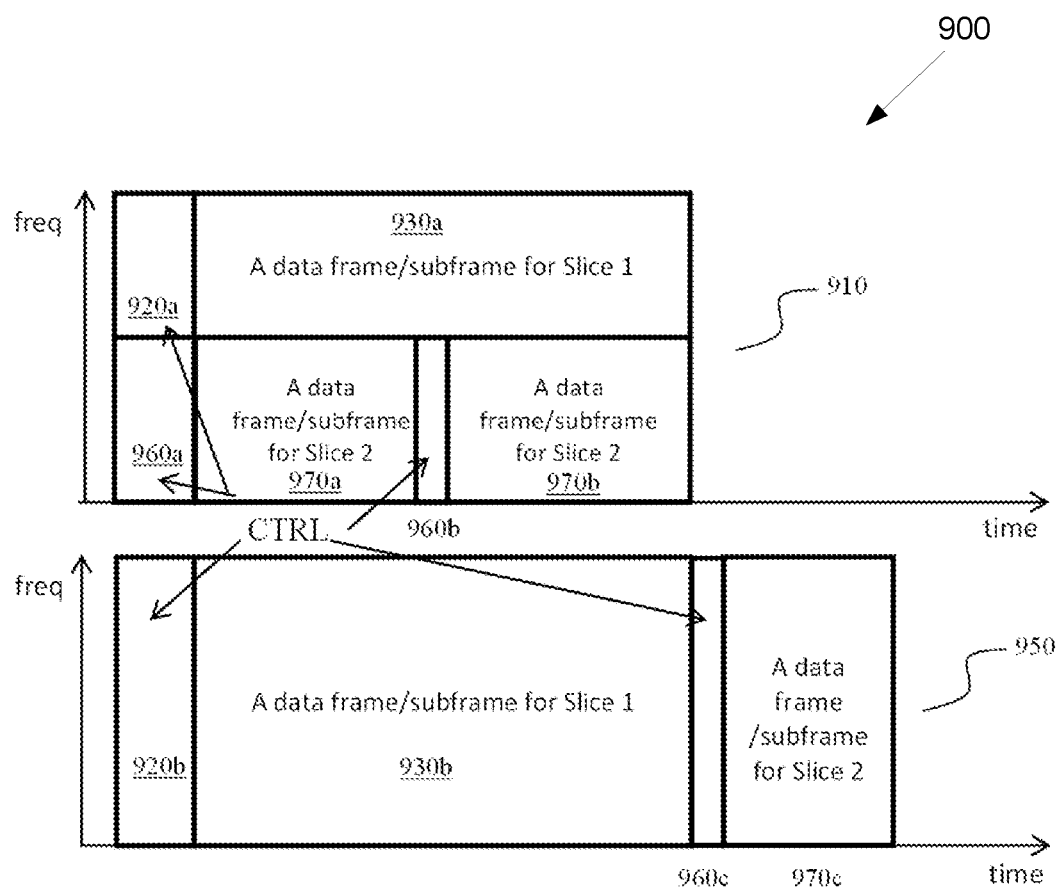
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

3GPP specification supports up to 32 CSI-RS antenna ports which enable an gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
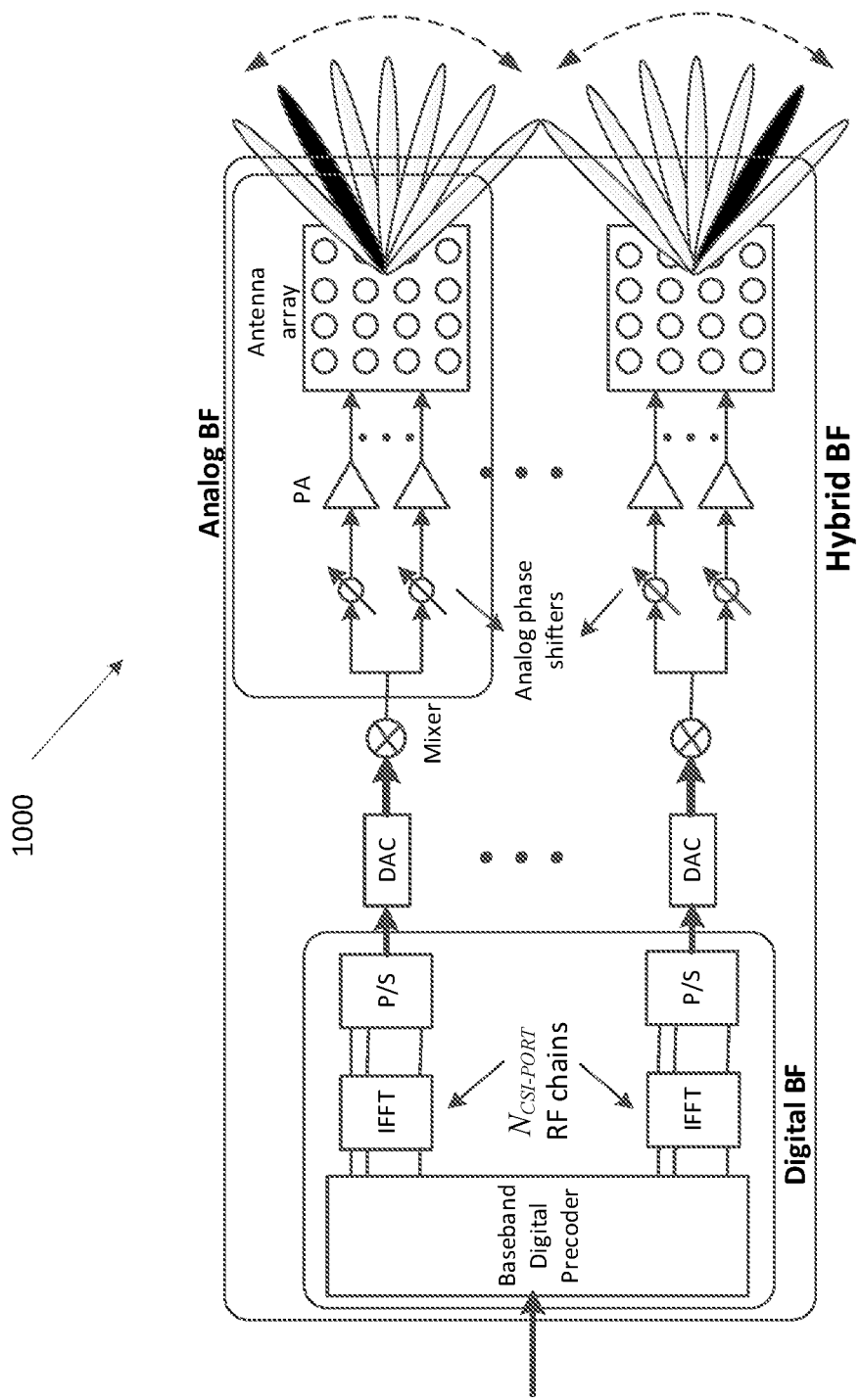
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Figure 11:
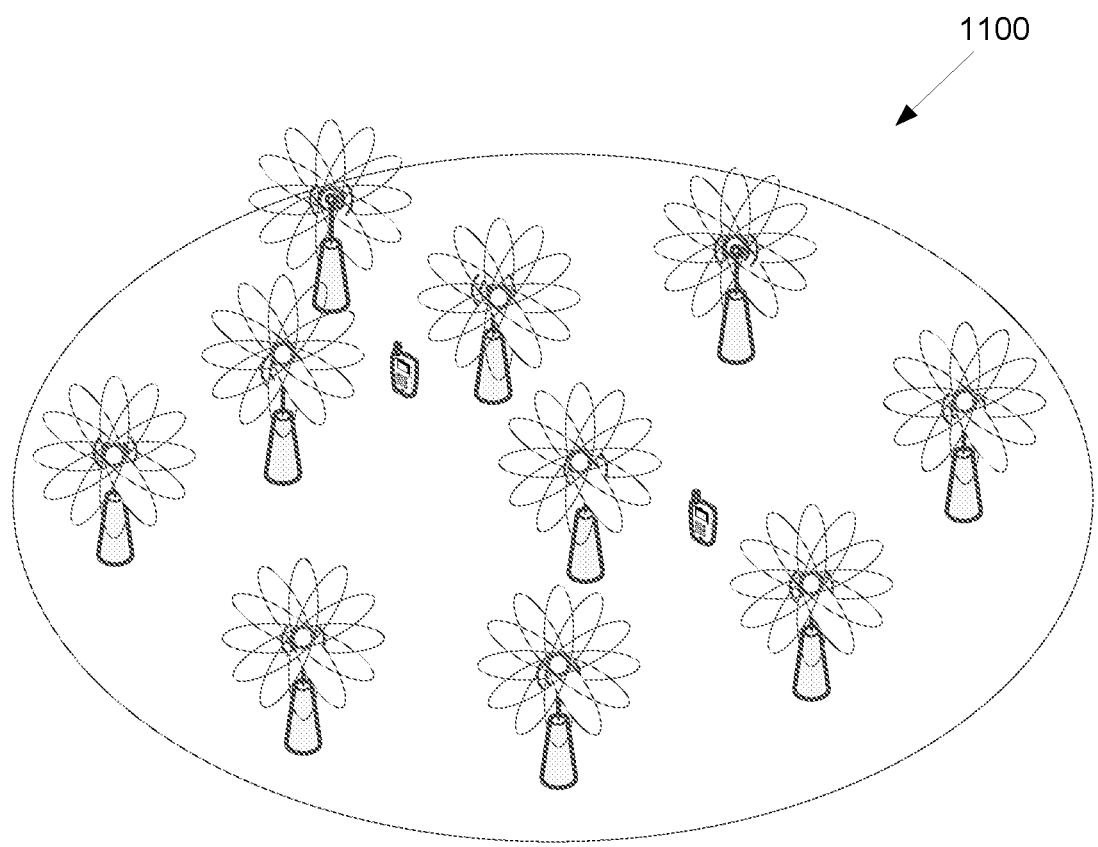
FIG. 11 illustrates an example multi-beam system according to embodiments of the present disclosure.

FIG. 11 illustrates an example multi-beam system 1100 according to embodiments of the present disclosure. The embodiment of the multi-beam system 1100 illustrated in FIG. 11 is for illustration only. FIG. 11 does not limit the scope of this disclosure to any particular implementation.

In LTE, a number of CSI reporting modes exist for both periodic (PUCCH-based) and aperiodic (PUSCH-based) CSI reporting. Each CSI reporting mode is dependent on (coupled with) many other parameters (e.g., codebook selection, transmission mode, eMIMO-Type, RS type, number of CRS or CSI-RS ports). At least two drawbacks can be perceived. First, complex "nested loops" (IF . . . ELSE . . . ) and webs of couplings/linkages exist. This complicates testing efforts. Second, forward compatibility is limited especially when new features are introduced.

While the above drawbacks apply to DL CSI measurement, the same can be said for UL CSI measurements. In LTE, UL CSI measurement framework exists in a primitive form and is not as evolved as DL counterpart. In the advent of TDD or reciprocity-based systems for next generation systems along with the likely prominence of OFDMA or OFDMA-based multiple access for UL, a same (or at least similar) CSI measurement and reporting framework applicable for both DL and UL is beneficial.

The 5G system is generally a multi-beam based system. In such a system, multiple beams are used to cover one coverage area. An example for illustration is shown in FIG. 11. As shown in FIG. 11, one gNB has one or more TRPs. Each TRP uses one or more analog beams to cover some area. To cover one UE in one particular area, the gNB use one or more analog beams to transmit and receive the signal to and from that UE. The gNB and the UE need to determine the beam(s) used for their connection. When the UE moves within one cell coverage area, the beam(s) used for this UE may be changed and switched. The operations of managing those beams are L1 and L2 operations.

In some embodiments, a UE can be configured with a set of $N \geq 1$ Tx beams, $\Phi_B = \{T_1, T_2, \ldots, T_N\}$, for one uplink channel. For one transmission on that uplink channel, the UE can choose one Tx beam from the configured set $\Phi_B = \{T_1, T_2, \ldots, T_N\}$ to transmit the data on that uplink channel. For one transmission on that uplink channel, the UE can be indicated with one Tx beam from the configured set $\Phi_B = \{T_1, T_2, \ldots, T_N\}$ by the serving gNB. The gNB can configure the UE that the UE needs to report the selected Tx beam to the gNB when the UE chooses one Tx beam.

This design is useful when the gNB needs know which Tx beam is used by the UE for uplink transmission so that the gNB is able to switch to proper receive beam to receive the uplink transmission. The gNB can configure the UE that the UE does not to report the selected Tx beam to the gNB when the UE chooses one Tx beam or changes the selection of Tx beams. This is useful when the gNB does not need know which Tx beam is chosen by the UE from the configured Tx beam set because all the Tx beams correspond to the same gNB receive beam. Therefore, the gNB does not know which Tx beam is selected by the UE from the configured set $\Phi_B = \{T_1, T_2, \ldots, T_N\}$.

In one embodiment, a UE can be configured with a set of $N \geq 1$ Tx beams, $\Phi_B = \{T_1, T_2, \ldots, T_N\}$, for a first uplink channel. For the transmission on a first uplink channel, the UE can choose one Tx beam from the configured set $\Phi_B = \{T_1, T_2, \ldots, T_N\}$ and then reports the information of the selected Tx beam to the gNB. After that, the UE can use the selected Tx beam to transmit signal on a first uplink channel. When the UE switches the Tx beam for a first uplink channel, the UE can report the information of switching Tx beam and newly selected Tx beam to the gNB.

In one example, a serving gNB can configure one or multiple RS (reference signal) resource IDs for a UE as the transmit beam information for a PUCCH channel. The UE can derive the spatial domain transmit filter based one of those RS resource IDs configured by the serving gNB. The RS resource ID can be a CSI-RS resource ID, SRS resource ID or SS/PBCH block index. The serving gNB can also signal one parameter to the UE to indicate that the UE can select any one from the configured RS resource IDs to derive the transmit filter for the PUCCH channel and the UE can be requested to report the selected RS resource ID to the gNB. When the UE switch from one RS resource ID to another RS resource ID, the UE can be requested to report the selected RS resource ID to the gNB.

In one example, a serving gNB configures a set of RS resource IDs for a UE as the transmit beam pool for a PUCCH channel: {RS ID1, RS ID2, ..., RS ID16}. When the UE selects or switches from one RS ID within the configured set to another RS ID within the configured set, the UE can be requested to report one indicator of the newly selected RS ID. The reported indicator can be index of the RS ID in the configured set.

For example, in the configured set {RS ID1, RS ID2, ..., RS ID16}, the UE can report indicator 0000 if RS ID1 is selected, 0001 if RS ID2 is selected, 0010 if RS ID 3 from the configured set is selected and 1111 if RS ID 16 from the configured set is selected. In one example, the UE can report such information in a MAC-CE message and the UE can apply the newly selected Tx beam after n slots when the ACK for the MAC-CE message carrying Tx beam selection information is received. The RS ID can be a CSI-RS resource ID, an SRS resource ID or an SS/PBCH block index.

Figure 12:
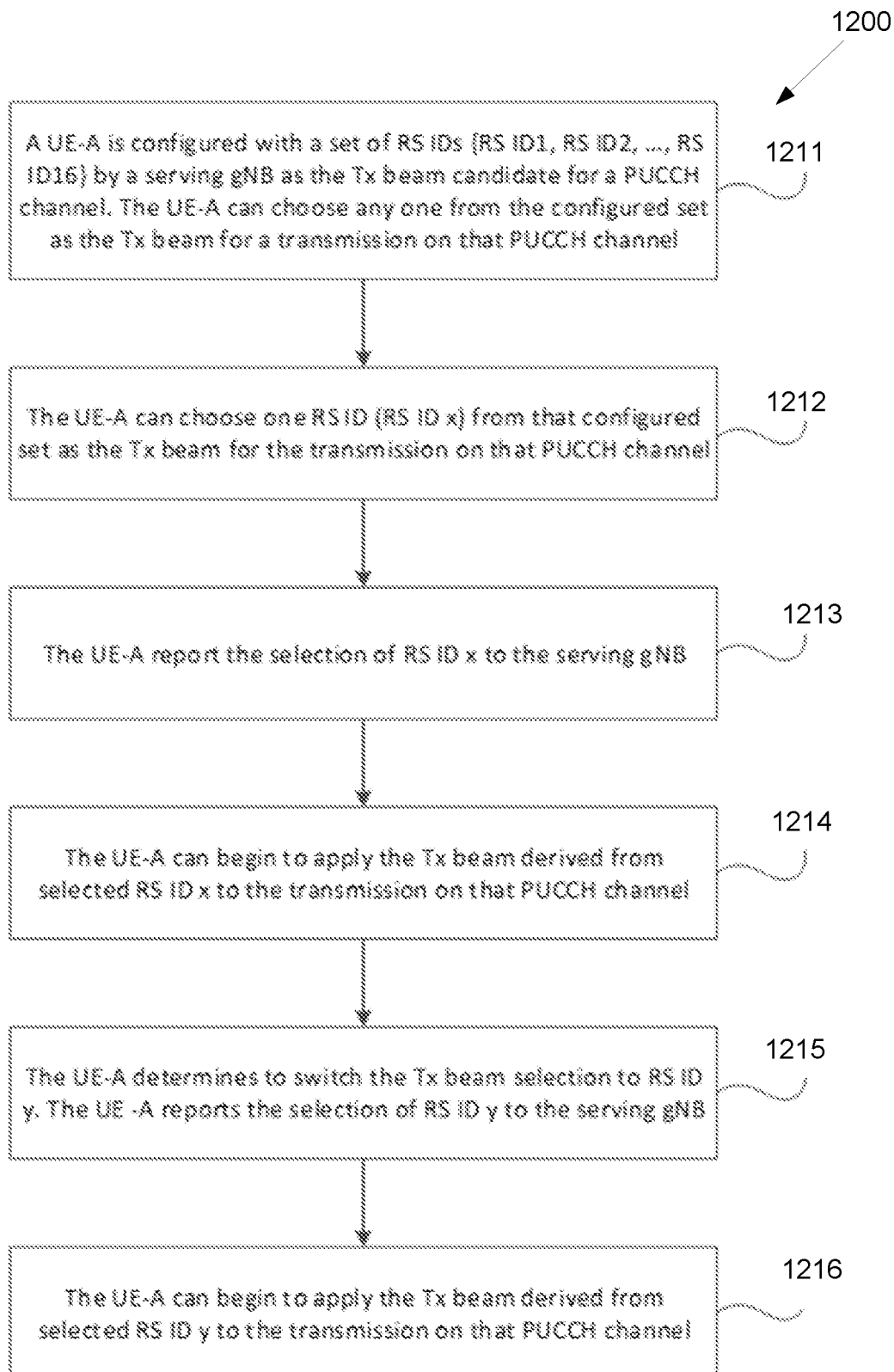
FIG. 12 illustrates a flowchart of a method for UE selecting Tx beam for a PUCCH channel according to embodiments of the present disclosure.

FIG. 12 illustrates a flowchart of a method 1200 for UE selecting Tx beam for a PUCCH channel according to embodiments of the present disclosure. The embodiment of the method 1200 illustrated in FIG. 12 is for illustration only. FIG. 12 does not limit the scope of this disclosure to any particular implementation.

As shown in FIG. 12, a UE-A can be configured by a serving gNB with a set of RS IDs, for example {RS ID 1, RS ID2, ..., RS ID 16} as the Tx beam candidates for the transmission on a PUCCH channel in step 1211. For the transmission on the PUCCH channel, the UE-A can choose one RS ID from the configured set and the UE-A chooses RS ID x in step 1212. Then the UE-A can report the selection of RS ID x to the serving gNB in step 1213. After reporting to the serving gNB, the UE-A can start to apply the Tx beam derived from selected RS ID x to the transmission on that PUCCH channel in step 1214. The UE-A can change the Tx beam selection after a while, for example, the UE-A might find another Tx beam has better quality. In step 1215, the UE-A determines to switch the Tx beam for the PUCCH channel from the RS ID x to the RS ID y. Then the UE-A reports the selection of RS ID y to the serving gNB in step 1215. After reporting the Tx beam switching and newly selected RS ID y, the UE can start to apply the Tx beam derived from the newly selected RS ID y on the transmission on that PUCCH channel.

In one embodiment, a UE can be configured with a set of $N \geq 1$ Tx beams, $\Phi_B = \{T_1, T_2, \ldots, T_N\}$, for a first uplink channel. For the transmission on a first uplink channel, the UE can choose one Tx beam from the configured set $\Phi_B = \{T_1, T_2, \ldots, T_N\}$. When the UE finds one Tx beam, $T_{opt}$, is good choice for transmission on a first uplink channel but that beam is in the configured set $\Phi_B = \{T_1, T_2, \ldots, T_N\}$, then the UE can report that new Tx beam, $T_{opt}$, to the serving gNB.

After the UE reports the newly selected Tx beam to the gNB, the UE can do one or more of the following: the UE can switch the newly suggested Tx beam $T_{opt}$ for the transmission on a first uplink channel; and/or both gNB and UE update the configured set $\Phi_B = \{T_1, T_2, \ldots, T_N\}$ by including that newly suggested Tx beam $T_{opt}$ to $\Phi_B = \{T_1, T_2, \ldots, T_N, T_{opt}\}$.

In one embodiment, a UE can be configured with a set of $N \geq 1$ Tx beams, $\Phi_B = \{T_1, T_2, \ldots, T_N\}$, for one uplink channel. For the transmission on the uplink channel, the UE can choose any one Tx beam from the configured set $\Phi_B = \{T_1, T_2, \ldots, T_N\}$. The UE can be configured with that the UE can choose any one T beam from the configured set $\Phi_B = \{T_1, T_2, \ldots, T_N\}$ and does not need report the selection to the gNB.

In one example, a serving gNB can configure a set RS IDs {RS ID1, RS ID2, ..., RS ID16} to a UE for the UE to determine the transmit beam (or called spatial domain transmit filter) for a PUCCH channel. When the UE selects one RS ID from that configured set, the UE can derive the spatial domain transmit filter for the transmission on that PUCCH channel. The serving gNB can configure a parameter for the configured RS ID set to indicate that when the UE switch the RS choice from one RS ID to another RS ID within this configured RS ID set, the UE does not need to report the switch to the serving gNB. This example is useful in the case where the gNB would use the same Rx beam to receive any Tx beam in the configured set. Therefore, the gNB does not need to know which Tx beam is selected from that set by the UE.

Figure 13:
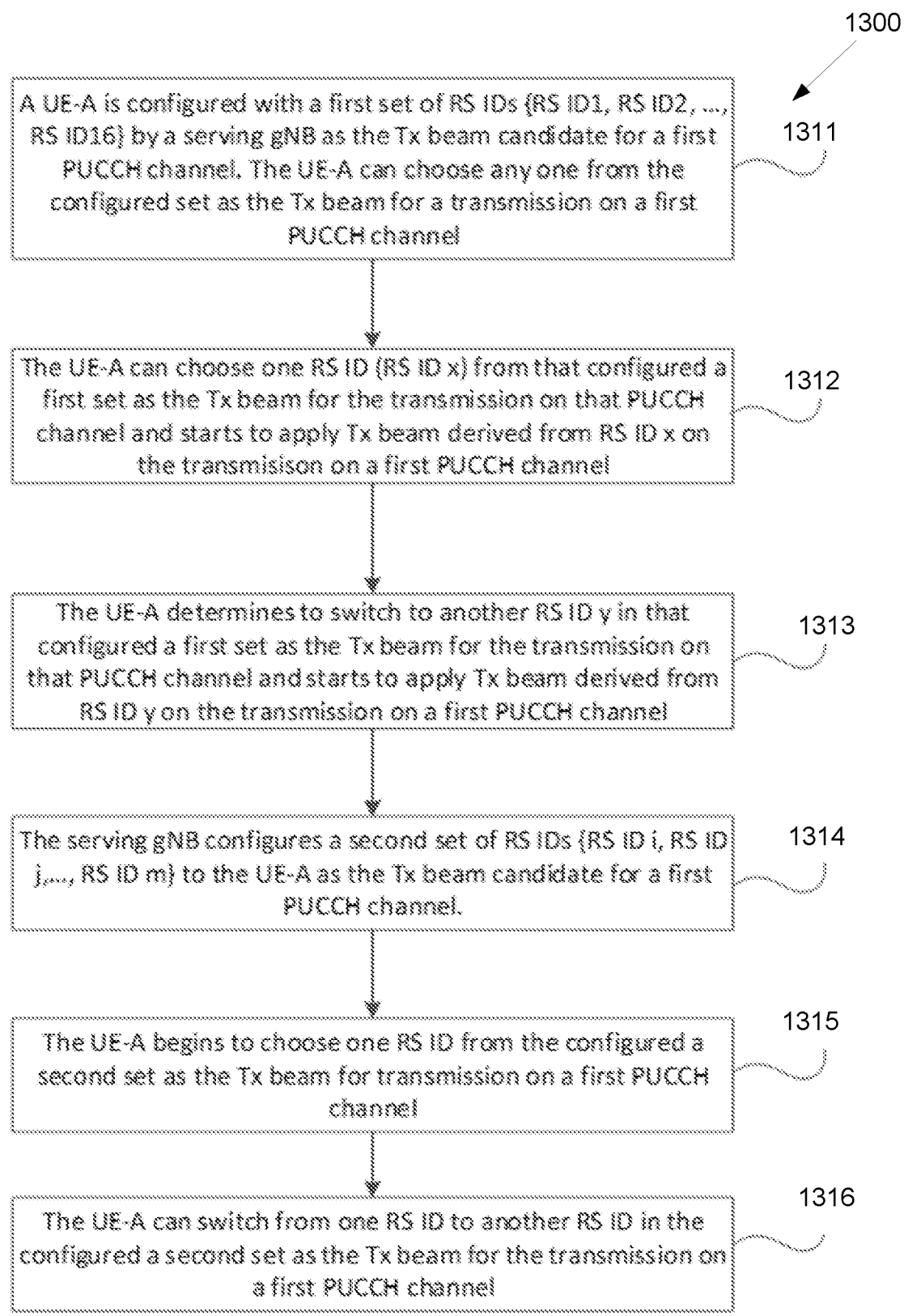
FIG. 13 illustrates another flowchart of a method for UE selecting Tx beam for a PUCCH channel according to embodiments of the present disclosure.

FIG. 13 illustrates another flowchart of a method 1300 for UE selecting Tx beam for a PUCCH channel according to embodiments of the present disclosure. The embodiment of the method 1300 illustrated in FIG. 13 is for illustration only. FIG. 13 does not limit the scope of this disclosure to any particular implementation.

As shown in FIG. 13, a UE-A can be configured by a serving gNB with a first set of RS IDs, for example {RS ID1, RS ID2, . . . , RS ID 16} as the Tx beam candidate for the transmission on a first PUCCH channel in step 1321. Then the UE-A can choose one RS ID, RS ID x, from the configured a first RS ID set to derive the Tx beam for the transmission on a first PUCCH channel and the UE-A does not report the selection to the serving gNB in step 1322. In step 1323, the UE-A determines to switch the Tx beam from RS ID x to another RS ID, RS ID y in the configured a first set in step 1323. The UE-A can begin to apply Tx beam derived from the newly selected RS ID y on the transmission on a first PUCCH channel and the UE-A does not report the beam switch to the serving gNB in step 1323.

The serving gNB can re-configure the RS ID set for a first PUCCH channel. In step 1324, the serving gNB configures a second set of RS IDs, for example {RS ID i, RS ID j, . . . , RS ID m} to the UE-A as the Tx beam candidate for the transmission on a first PUCCH channel in step 1324. Then the UE-A can be requested to select one RS ID within the newly configured a second set as the Tx beam for the transmission on a first PUCCH channel. In step 1325, the UE-A selects one RS ID from the configured a second RS ID set to derive the Tx beam for the transmission on a first PUCCH channel and the UE-A does not need to report the RS ID selection to the serving gNB. The UE-A can switch the selection of RS IDs within the configured a second set to derive the Tx beam for the transmission on a first PUCCH channel without reporting the Tx beam switch to the serving gNB. In step 1326, the UE-A finds another TX beam has better quality than the Tx beam currently used for a first PUCCH channel and the UE-A can switch the RS ID selection from the current selected RS ID to another RS ID within the configured a second RS ID set for the transmission on a first PUCCH channel.

In one embodiment, a UE can be configured with a set of N>=1 UL Tx beams, $\Phi_B$, for one uplink channel and the configured beam set $\Phi_B$ is configured with multiple subsets of UL Tx beam, for example $\Phi_B=\{\Phi_{Bi}=T_{i1}, T_{i2}, \ldots, T_{iN}\}$, $\Phi_{Bj}=\{T_{j1}, T_{j2}, \ldots, T_{jN}\}\}$. The UE can be configured to operate the following behavior: when the UE switch the Tx beam within one configured subset, the UE does not need to report the selected Tx beam ID or Tx beam subset ID to the gNB; and/or when the UE switch the Tx beam from one configured subset to another configured subset, the UE needs to report the newly selected Tx beam subset ID or newly selected Tx beam ID to the gNB;

In one embodiment, a UE can be configured with a set of multiple Tx beam candidates for a PUCCH resource. In such embodiment, one of those configured Tx beams can be used to transmit the PUCCH. The UE can be configured with a parameter A that indicates whether the UE can freely select any one from those configured Tx beams as the Tx beam for the PUCCH resource. In other word, the parameter A can indicate that the UE can select and switch the selection of Tx beam among those configured Tx beams for PUCCH channel to use the Tx beam as the Tx beam for PUCCH transmission without reporting to the gNB or receiving activation command from the gNB on selection of one of those Tx beam for PUCCH.

In one example, a UE can be configured with a set of Tx beams $\{T_1, T_2, \ldots, T_K\}$ for PUCCH and the UE is configured with a parameter A for those configured Tx beams $\{T_1, T_2, \ldots, T_K\}$, if the value of A is to 1, then the UE can select any one from $\{T_1, T_2, \ldots, T_K\}$ for a transmission on the associated PUCCH without the serving gNB and the UE can switch between any two Tx beam within $\{T_1, T_2, \ldots, T_K\}$ for a transmission on the associated PUCCH without reporting the serving gNB.

And if the value of A is set to 0, the UE can be requested to apply the Tx beam that is selected by a signaling from the serving gNB, for example, a MAC-CE message from the serving gNB to select one from $\{T_1, T_2, \ldots, T_K\}$ for the Tx beam for the PUCCH. One alternative for the parameter A is the presence and absence of A can indicate different options. The presence of parameter A can indicate that the UE can select any one from $\{T_1, T_2, \ldots, T_K\}$ for a transmission on the associated PUCCH without the serving gNB and the UE can switch between any two Tx beam within $\{T_1, T_2, \ldots, T_K\}$ for a transmission on the associated PUCCH without reporting the serving gNB.

And the absence of parameter A can indicate that the UE can be requested to apply the Tx beam that is selected by a signaling from the serving gNB, for example, a MAC-CE message from the serving gNB to select one from $\{T_1, T_2, \ldots, T_K\}$ for the Tx beam for the PUCCH.

In one example, a UE can be configured with multiple values in higher layer parameter pucch-SpatialRelationInfold and those values are IDs of reference signals, for example CSI-RS resource ID, SS/PBCH index and SRS resource ID. The UE can be configured with a parameter pucch-SpatialRelationIndicator for spatial setting of PUCCH transmission. If the value of pucch-SpatialRelationIndicator is set to 1, the UE can select any value configured in pucch-SpatialRelationInfold as the spatial setting for a PUCCH transmission and the UE can apply a corresponding setting for a spatial domain filter to transmit PUCCH based on the UE's selection.

If the value of pucch-SpatialRelationInfold is set to 0, the UE may expect to receive a signaling message (for example MAC CE) from the serving gNB that selects one value from the multiple values configured in pucch-SpatialRelationInfold and then can apply a corresponding setting for a spatial domain filter to transmit PUCCH based on selected value. In another alternative, the presence and absence of parameter pucch-SpatialRelationIndicator can indicate the UE action in the same way as the value of pucch-SpatialRelationIndicator being 1 or 0.

In one embodiment, a UE can be configured to measure multiple downlink Tx beams and then reports one or more than one downlink Tx beam IDs and/or the measured L1-RSRP (or L1-RSRQ or L1-SINR) of the reported Tx beam IDs. Along with the beam reporting, the UE can be requested to use the uplink Tx beam that corresponds to one of the reported downlink Tx beam ID (for example the downlink Tx beam ID with the largest L1-RSRP or largest L1-RSRQ or largest L1-SINR among the reported downlink Tx beam IDs) on the transmission of one uplink channels (for example PUCCH channel, PUSCH channel or SRS transmission). This embodiment is useful to reduce the signaling overhead and latency for indicating Tx beam for uplink transmission.

In one example, a UE can be configured to measure M CSI-RS resources and then report N=4 selected CSI-RS resources from the configured M CSI-RS resources and the corresponding L1-RSRP. In one instance, the UE can report the indicators of N=4 CSI-RS resources with the largest L1-RSRPs. After the UE reports the CRI (CSI-RS resource indicator) of N=4 selected CSI-RS resources and their corresponding L1-RSRP at slot $n_1$, then the UE can assume to apply the CRI with largest L1-RSRP in the beam report at slot n1 to derive the Tx beam for the transmission on PUCCH channel starting from slot $n_1$+L, where L>0 is a value that can be (pre)configured.

In one embodiment, a UE can be indicated with information of an RS ID (for example the ID of one downlink reference signals, a CSI-RS resource ID, a SS/PBCH ID, for example the ID of one uplink reference signals, an SRS resource ID) in downlink physical layer signaling, for example one DCI, to indicate the Tx beam indication for the transmission on PUCCH channel. This embodiment is useful for quick beam indication and switch for PUCCH channel.

In one example, a UE can be configured with a set of RS IDs through high layer message (for example MAC-CE) as the Tx beam candidate for PUCCH channel. For example, the UE is configured with a first set of RS IDs {RS ID1, RS ID2, RS ID3, . . . , RS ID16}. Then a DCI (downlink control information) element can be sent to signal one 4-bit field to indicate the selection of one RS ID from the configured a first set. For example, the value of 0000 of that 4-bit in the DCI can indicate the selection of RS ID1, 0001 means the selection of RS ID2, . . . , 1111 means the selection of RS ID 16.

When receiving one DCI with 4-bit field indicating Tx beam for PUCCH, the UE first derives the RS ID according to the value of that 4-bit field and then the UE derive the Tx beam (or called spatial domain transmit filter) for the PUCCH channel according to the calculated RS ID. Assuming the DCI is received at slot n, the UE can be requested to start to apply the Tx beam derived from the RS ID indicated by the received 4-bit from slot n+L, where L can be preconfigured or signaled in some control signaling (for example in the same DCI where 4-bit field is signaled).

In one embodiment, the UE can be configured or indicated with one uplink reference signal ID to indicate the downlink Tx beam selection for downlink transmission (for example PDCCH transmission, PDSCH transmission). This embodiment would enable the system to use uplink reference signal to indicate the downlink Tx beam selection for downlink transmission for a UE.

In one example, a UE can be configured with M TCI (transmission configuration indicator) states and in each TCI state, there can be one RS ID configured as the spatial QCL parameter. In such example, this RS ID can be an ID of one SRS resource. If a TCI with an SRS resource ID as the spatial QCL parameter is configured as the QCL indication for PDSCH transmission to a UE, the UE may use the SRS resource ID to derive the spatial domain receive filter to receive that PDSCH transmission.

In one example, a UE is indicated with a TCI with spatial QCL parameter to be a first SRS resource ID and the configured TCI is the QCL indication for the PDSCH transmission to the UE, the UE may assume the DM-RS reference signals in the PDSCH transmission is spatial QCLed to the a first SRS resource indicated in the configured TCI states, To receive the PDSCH and the DM-RS associated with the PDSCH allocation, the UE may use the spatial domain receive filter same to the spatial domain transmit filter that is used to transmit a first SRS resource.

Figure 14:
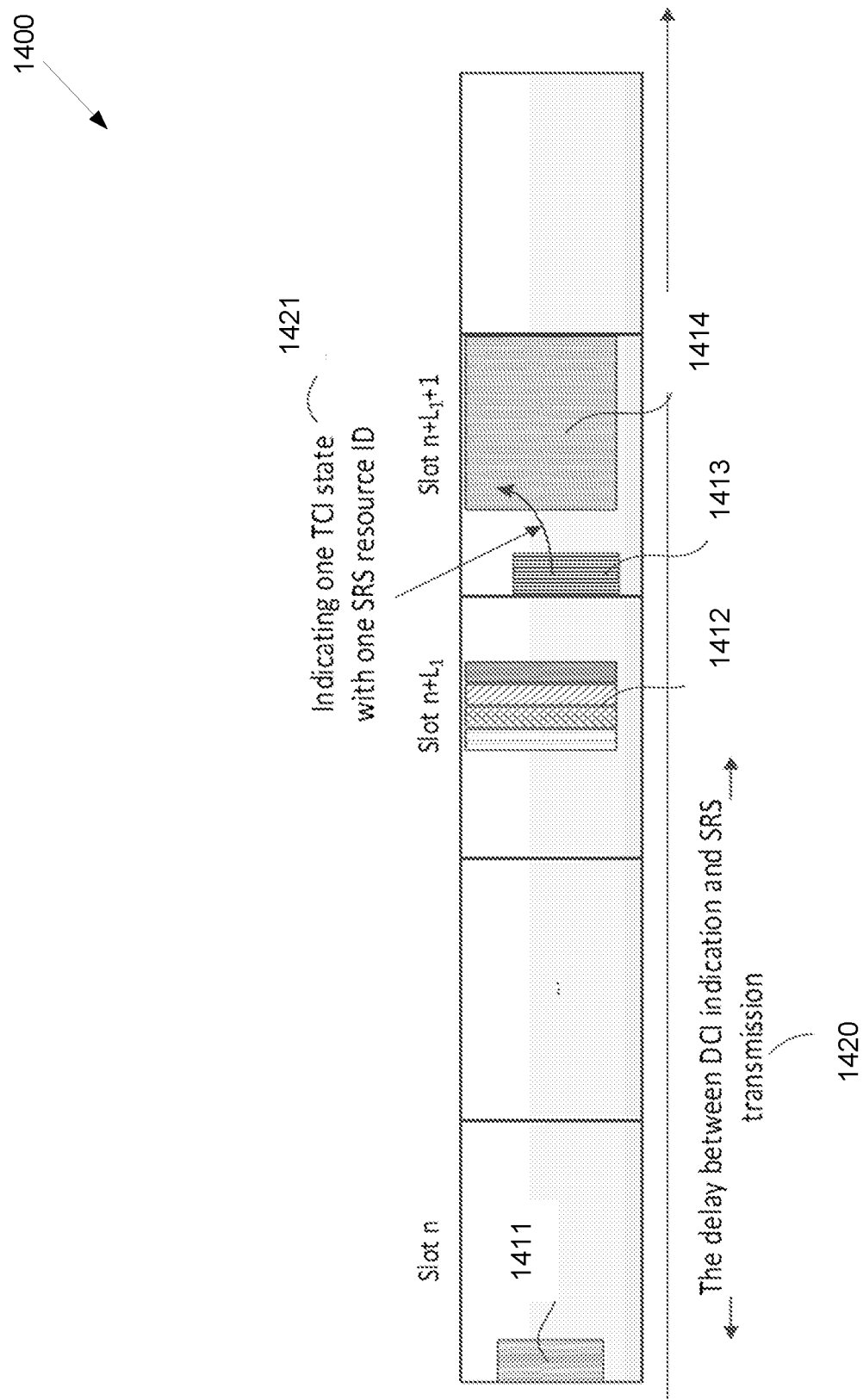
FIG. 14 illustrates an example indicating spatial QCL parameter for PDSCH to a UE according to embodiments of the present disclosure.

FIG. 14 illustrates an example indicating spatial QCL parameter 1400 for PDSCH to a UE according to embodiments of the present disclosure. The embodiment of the indicating spatial QCL parameter 1400 illustrated in FIG. 14 is for illustration only. FIG. 14 does not limit the scope of this disclosure to any particular implementation.

As shown in FIG. 14, a serving gNB can send a PDCCH 1411 in slot n to schedule the transmission of SRS resources to a UE-A. Then the UE-A transmits SRS resources 1412 in slot n+$L_1$ as indicated by PDCCH 811. The serving gNB can measure the SRS resources 1412 to find out which beam pair link has good link quality. Then in slot n+$L_1$+1, the serving gNB can send PDCCH 1413 to schedule a PDSCH transmission 1414 to UE-A and the PDCCH 1413 can indicate one TCI state as the QCL configuration for the scheduled PDSCH transmission 1414.

In the PDCCH 1413, the serving gNB can indicate one TCI state with RS ID used for a spatial QCL parameter to be one of the SRS resources and the serving gNB just measures in slot n+$L_1$. Through the designed method, the latency of beam switch for a PDSCH channel is roughly equal to the delay between one PDCCH and transmission of SRS resources indicated by the PDCCH 1420. As specified in 3GPP specification, the delay between scheduling PDCCH and the transmission of SRS is 42+$N_2$ symbols, which can be as small as 3 slots.

The delay of beam indication for downlink channel (for example PDSCH) is at least the sum of delay between scheduling PDCCH and the transmission of CSI-RS resources and the delay between the transmission of CSI-RS resources and the reporting of beam measurement. In comparison, the delay of beam indication for downlink channel (for example PDSCH) is only the delay between scheduling PDCCH and the transmission of SRS resources that is scheduled by the scheduling PDCCH.

In one embodiment, a UE can be configured to measure the L1-RSRP (or L1-RSRQ or L1-SINR) of one or more PDCCH transmission and then report one or more selected PDCCH ID information and/or the corresponding L1-RSRP (or L1-RSRQ or L1-SINR) measurement of those reported PDCCH ID(s). This embodiment is useful for the system to dynamic select the "best" PDCCH for downlink transmission. Assume a UE is configured with multiple PDCCH channels, based on the quick beam measurement on those PDCCHs, the serving gNB is able to select the PDCCH channel with best beam quality for the downlink transmission.

In one example, a UE can be configured with K control resource sets (CORESET) as the resource for monitoring PDCCH. The Tx beam indication for PDCCH is operated per control resource set. With association to each control resource set, the UE can be configured with one or more search spaces in which the monitoring PDCCH is configured. The UE can be configured to measure L1-RSRP (or L1-RSRQ, or L1-SINR) of those K CORESETs and then report one or more selected CORESET IDs and/or the corresponding L1-RSRP measurement (or L1-RSRQ, L1-SINR).

In one example, a UE is configured with K CORESETs {$C_1, C_2, \ldots, C_K$} and the UE can be signaled with a CSI request field in one DCI sent in slot n. The received CSI request field can indicate one a first configured CSI trigger state and a first configured CSI trigger state is associated with a first reporting setting. If in a first reporting setting, the UE is configured to report L1-RSRP measurement of PDCCH (or L1-RSRQ, L1-SINR), then the UE can be requested to report the L1-RSRP measurement of PDCCH of configured CORESET in $\{C_1, C_2, \ldots, C_K\}$. To measure the L1-RSRP (or L1-RSRQ or L1-SINR) of one CORESET $C_k$, the UE can be requested to measure the PDCCH transmitted in one search space associated with CORESET $C_k$ in the first slot no earlier than slot n, where one search space associated with CORSET $C_k$ is configured.

In one example, for the L1-RSRP (or L1-RSRQ or L1-SINR) reporting of PDCCH, the UE is configured with 3 CORESETs $\{C_1, C_2, C_3\}$. The UE can report a 3-bit field as one CORESET ID indicator to represent one selected CORESET. The UE can report bits 00 to represent the CORESET with lowest control resource set ID among $\{C_1, C_2, C_3\}$ and report bits 01 to represent the CORESET with the second lowest control resource set ID among $\{C_1, C_2, C_3\}$ and report bits 10 to represent the CORESET with the largest control resource set ID among $\{C_1, C_2, C_3\}$. In one example, the UE can report a few bits to represent the L1-RSRP (or L1-RSRQ or L1-SINR) for each reported CORESET ID indicator.

In one example, when the UE reports more than one CORESET ID indicators, the UE can also report the L1-RSRP (or L1-RSRQ or L1-SINR) measurement of the reported CORESETs. In one example, when the UE reports more than one CORESET ID indicators, the UE can report L1-RSRP (or L1-RSRQ or L1-SINR) measurement of the reported CORESET with the largest L1-RSRP (or L1-RSRQ or L1-SINR) and report differential L1-RSRP (or differential L1-RSRQ or differential L1-SINR) of all the other reported CORESETs.

In one embodiment, a UE can be configured with a first SRS resource and the UE can also be configured with a Tx beam for a first SRS resource. When the UE is requested to transmit a first SRS rescore, the UE may apply the configured Tx beam on the transmission of a first SRS resource. In such embodiment, the Tx beam for a first SRS resource can be dynamically updated through a downlink signaling (for example a MAC CE or a DCI) command. When the UE receives one downlink signaling (for example a MAC CE or a DCI), the UE may update the Tx beam configuration for a first SRS resource to the latest configuration and apply the updated Tx beam when transmitting a first SRS resource.

In one example a UE can be configured with a first SRS resource and the resource type of a first SRS resource is set to aperiodic. The serving gNB can send one MAC CE message to indicate one RS ID (e.g., an ID of one CSI-RS resource, index of one SS/PBCH block, or an ID of another SRS resource) to the UE as the Tx beam (or called SRS-SpatialRelationInfo parameter) for a first SRS resources. When receiving such a MAC CE command, the UE may update the SRS-SpatialRelationInfo parameter for a first SRS resource to the RS ID indicated in that MAC CE command. When a first SRS resource is triggered for transmission in some DCI at slot n, the UE may apply the SRS-SpatialRelationInfo indicated in the latest MAC CE message that indicates the SpatialRelationInfo for a first SRS resource to derive the Tx beam (or called spatial domain transmit filter) for the transmission of a first SRS resource.

In one embodiment, a UE can be configured with a first SRS resource and a UE can be configured with multiple Tx beam candidates. Then when triggering the transmission of a first SRS resource, the gNB can indicate one Tx beam among the configured Tx beam candidates to the UE and the UE may apply the dynamically indicated Tx beam to transmit a first SRS resource.

In one embodiment, a UE can be configured with one or multiple SRS resource sets and in each set, there can be one or more SRS resources. Those SRS resource can be configured with SRS resource type to be aperiodic. In other words, those SRS resources are aperiodic SRS resource. The UE can be configured with one or more aperiodic SRS trigger states.

In each of the aperiodic SRS trigger state, one or more of the following information can be configured: the IDs of SRS resources that are associated with that aperiodic SRS trigger state; the ID(s) of SRS resource sets that are associated with that aperiodic SRS trigger state; and/or for each SRS resource associated that aperiodic SRS trigger state, one SRS-SpatialRelationInfo parameter can be configured to be an RS ID (for example ID of one CSI-RS resource, index of one SS/PBCH block or ID of another SRS resource).

It is noted that the same SRS resource is associated into more than aperiodic SRS trigger states and configure different SRS-SpatialRelationInfo parameter to that SRS resource in different aperiodic SRS trigger states.

A first N-bit field in DCI (downlink control information element) can be used to indicate one of those configured aperiodic SRS trigger states. The length of a first N-bit field in DCI can be fixed to some value, for example 6 bits. In another example, the length of a first N-bit field in DCI can depend on the number of aperiodic SRS trigger states configured by the gNB and one example of N is $N=\lceil \log_2 M_{SRS} \rceil$ where $M_{SRS}$ is the total number of aperiodic SRS trigger states configured by the gNB.

At a slot n, if the UE receiver one DCI containing a first N-bit field indicating a second aperiodic SRS trigger state among the configured states, the UE may update the SRS-SpatialRelationInfo parameter of the SRS resources associated with the indicated a second aperiodic SRS trigger state to the SRS-SpatialRelationInfo configured in a second aperiodic SRS trigger state. For a first SRS resource associated a second aperiodic SRS trigger state, the UE can assume the Tx beam for a first SRS resource to be the SRS-SpatialRelationInfo configured in a second aperiodic SRS trigger state until one aperiodic SRS trigger state associated with a first SRS resource is signaled.

In one embodiment, a UE can be configured with one or more SRS (sounding reference signal) resource sets and for each SRS resource set, the UE can be configured with K≥1 SRS resources. For each SRS resource, an srs-ResourceId parameter can be configured to determine the SRS resource configuration identify and the parameters for the transmission configuration of that SRS resource. For aperiodic SRS resources, the UE can be configured with one or more aperiodic SRS trigger states by the higher layer parameter Aperiodic-SRS-TriggerStateList. The parameter Aperiodic-SRS-TriggerStateList can contain one or more Aperiodic-SRS-TriggerState, each of which can define one aperiodic SRS trigger state.

In each configured aperiodic SRS trigger state p, it can be configured that: a list of SRS resource set(s) is(are) associated with the aperiodic SRS trigger state p; and/or a list of reference signal identities (for example, CSI-RS index, SS/PBCH block index, SRS index) for providing the spatial relation source for each SRS resource listed in the SRS resource set(s) associated with the aperiodic SRS trigger state p.

Then the serving gNB can use an SRS-request bit field in DCI to indicate one of those configured aperiodic SRS trigger states configured in Aperiodic-SRS-TriggerStateList and the state of the SRS-request bit field can select one of those configured aperiodic SRS trigger states configured in Aperiodic-SRS-TriggerStateList.

When the UE receive a DCI containing an SRS-request bit field whose state indicates one of those configured aperiodic SRS trigger states, the UE can be requested to transmit the SRS resources in the SRS resource set(s) associated with the indicated aperiodic SRS trigger state and the UE can be requested to transmit the SRS resources in the SRS resource set(s) associated with the indicated aperiodic SRS trigger state by applying the spatial relation configuration according to the list RS IDs for providing spatial relation reference configured in the indicated aperiodic SRS trigger state.

In one embodiment, a UE can be configured with one or more SRS (sounding reference signal) resource sets and for each SRS resource set, the UE can be configured with K≥1 SRS resources. For each SRS resource, an srs-ResourceId parameter can be configured to determine the SRS resource configuration identify and the parameters for the transmission configuration of that SRS resource.

In one example, for one aperiodic SRS resource, a list of one or more IDs of reference signals can be configured through a higher layer parameter SRS-spatialRelationInfo. The reference RS can be an SS/PBCH block, CSI-RS, or an CSI-RS. The list of IDs of reference RS is used to provide the spatial relation reference for that SRS resource (i.e., the Tx beam information for that SRS resource).

In another example, the UE can be configured with one or more aperiodic SRS trigger states by the higher layer parameter Aperiodic-SRS-TriggerStateList. The parameter Aperiodic-SRS-TriggerStateList can contain one or more Aperiodic-SRS-TriggerState, each of which can define one aperiodic SRS trigger state. In each configured aperiodic SRS trigger state p, a list of SRS resource set(s) that is(are) associated with the aperiodic SRS trigger state p can be configured.

Then one bit-field SRS-request in DCI can be used to indicate selecting one of those configured aperiodic SRS trigger states configured in Aperiodic-SRS-TriggerStateList and one bit-field SRS-spatialRelation-Request in DCI can be used to indicate selection of one of the RS IDs in higher layer parameter SRS-spatialRelationInfo of each SRS resources associated with the aperiodic SRS trigger state indicated by the SRS-request bit-field in the same DCI.

In one example, a UE receive one DCI containing bit-field SRS-request set to be state X1 and bit-field SRS-spatialRelation-Request set to be state Y1 at slot n, the UE can be request to do the followings: the UE can be requested to transmit the SRS resources in the SRS set(s) associated with the aperiodic SRS trigger state configured in Aperiodic-SRS-TriggerStateList, which is indicated by state X1 of bit-field SRS-request; and/or for each SRS resource that the UE is requested to transmit, the UE may apply the spatial relation reference according to one of the ID (from the list of RS IDs configured in parameter SRS-spatialRelationInfo configured to that SRS resource) that is indicated by state Y1 of bit-field SRS-spatialRelation-Request and the UE may transmit the SRS resource with the same spatial domain transmit filter as indicated by the selected RS ID In one embodiment, a UE can be configured with one or more SRS (sounding reference signal) resource sets and for each SRS resource set, the UE can be configured with K≥1 SRS resources. For each SRS resource, an srs-ResourceId parameter can be configured to determine the SRS resource configuration identify and the parameters for the transmission configuration of that SRS resource.

The UE can be configured the followings. In one example, the UE can be configured with one or more aperiodic SRS trigger states by the higher layer parameter Aperiodic-SRS-TriggerStateList. The parameter Aperiodic-SRS-TriggerStateList can contain one or more Aperiodic-SRS-TriggerState, each of which can define one aperiodic SRS trigger state. In each configured aperiodic SRS trigger state p, it can be configured that: a list of SRS resource set(s) that is(are) associated with the aperiodic SRS trigger state p is configured; and/or one of the trigger state configured in Aperiodic-SRS-TriggerStateist can be indicated by bit-field SRS-request in DCI.

In another example, the UE can be configured with one or more sets of reference signal IDs by the higher layer parameter SRS-SpatialRelationInfoList. Those reference signals are used to provide spatial relation reference to the aperiodic SRS resources associated with the aperiodic SRS trigger states configured in Aperiodic-SRS-TriggerStateList. In such example, one set of reference signal IDs configured in SRS-SpatialRelationInfoList can be indicated by bit-field SRS-spatialRelation-Request in DCI.

Then one bit-field SRS-request in DCI can be used to indicate selecting one of those configured aperiodic SRS trigger states configured in Aperiodic-SRS-TriggerStateList and one bit-field SRS-spatialRelation-Request in DCI can be used to indicate selection of set of RS IDs in higher layer parameter SRS-SpatialRelationInfoList. The UE can be requested to use the RS s of the set of RS IDs configured in SRS-SpatialRelationInfoList indicated by bit-field SRS-spatialRelation-Request as the spatial relation reference to the SRS resources in the SRS resource set(s) associated with the trigger state that is indicated by the bit-field SRS-request in the same DCI.

In one example, a UE receive one DCI containing bit-field SRS-request set to be state X1 and bit-field SRS-spatialRelation-Request set to be state Y1 at slot n, the UE can be requested to do the following. In one instance, the UE can be requested to transmit the SRS resources in the SRS set(s) associated with the aperiodic SRS trigger state configured in Aperiodic-SRS-TriggerStateList, which is indicated by state X1 of bit-field SRS-request.

In another instance, the UE can be requested to select one set of reference signal IDs configured in higher layer parameter SRS-SpatialRelationInfoList according to the state Y1 of bit-field SRS-spatialRelation-Request. The selected set of reference signal IDs is used by the UE as the spatial relation reference to the SRS resource that the UE is requested to transmit according to the state X1 of bit-field SRS-request.

In yet another instance, for each SRS resource that the UE is requested to transmit, the UE may apply the spatial relation reference according to reference signal ID in the set of RS ID that is indicated by state Y1 of bit-field SRS-spatialRelation-Request and the UE may transmit the SRS resource with the same spatial domain transmit filter as indicated by the indicated RS ID.

In one embodiment, a UE can configured with a set of reference signal IDs {$RS\_ID_1$, $RS\_ID_2$, $RS\_ID_3$, . . . , $RS\_ID_M$} as the candidate Tx beams for PDCCH channel in one CC or BWP and then one downlink signaling (for example a DCI format X1) can be used to indicate one RS ID from the configured RS ID set as the Tx beam for PDCCH channel. One UE can be requested to use the indicated information of Tx beam (RS ID) to derive the proper receiver beam to buffer the symbols of PDCCH channel. That design can remove the involvement of RRC in a beam management operation and the MAC-CE layer can pick the best few Tx beam as the candidate beam for PDCCH transmission and then use DCI to indicate and switch the Tx beam for PDCCH with low latency.

In general, for a UE to receive downlink channels, quasi co-location (QCL) assumption is needed by the UE. The Quasi location information can include: Doppler shift, Doppler spread, average delay, delay spread, and spatial Rx parameter. Here, the spatial Rx parameter is related with the Tx beam used to transmit one downlink channel and is used by the UE to derive the proper Rx beam to receive one downlink channel.

The following QCL information types can be defined: "QCL-TypeA," {Doppler shift, Doppler spread, average delay, delay spread}; "QCL-TypeB," {Doppler shift, Doppler spread}; "QCL-TypeC," {Doppler shift, average delay}; and "QCL-TypeD," {Spatial Rx parameter} where the QCL-TypeD is used to indicate the information of Tx beam used to transmit downlink channel and is used by a UE to derive the proper Rx beam (or called spatial domain receiver filter, or spatial Rx parameter) to receive the corresponding downlink channel.

In one example, a UE can be configured with a first set of QCL assumption entries: {QCL_ID$_1$, QCL_ID$_2$, QCL_ID$_3$, . . . , QCL_ID$_M$} as the candidate QCL assumption for PDCCH reception in one CC or BWP. In the configured set, each QCL assumption entry can contain one or more reference signal IDs and the reference signal IDs are used as source for some or all QCL information types.

In one example, one QCL assumption entry QCL_ID$_{m1}$ has one RS ID and the that RS ID is the source for both QCL-type A and QCL-Type D. In one example, one QCL assumption entry QCL_ID$_{m2}$ has two RS IDs and one RS ID is the source for QCL-type A and the other RS ID is the source for QCL-type D. Those reference signal IDs can be a CSI-RS resource index, a SS/PBCH block index and/or an SRS resource index. In one example, the set of spatial relations for PUCCH channel can be signaled through one MAC-CE message (e.g., RRC signaling in another example). A DCI format X1 can be used to select one entry from the a first set of QCL assumption for the transmission of PDCCH.

In one example, a DCI format X1 can contain one bit-field PDCCH QCL indicator with L2 bits to indicate one entry from the configured set {QCL_ID$_1$, QCL_ID$_2$, QCL_ID$_3$, . . . , QCL_ID$_M$} for PDCCH transmission and reception. To receive PDCCH transmission in one CC or BWP, the UE may derive the DM-RS of related PDCCH is QCLed to the RS ID of QCL assumption entry indicated by the value of bit-field PDCCH QCL indicator in the latest DCI format X1. The bit-length (i.e., number of bits) of bit-field PDCCH QCL indicator can be $\lceil \log_2 M \rceil$ where M is the number of entries configured in the set {QCL_ID$_1$, QCL_ID$_2$, QCL_ID$_3$, . . . , QCL_ID$_M$}.

In one example, a bit-field PDCCH QCL indicator in a DCI format X1 detected in PDCCH that is monitored in search space(s) associated with CORESET (control resource set) #n can be used to indicate QCL assumption indication for the CORESET #n. The bit field PDCCH QCL indicator in a DCI format X1 detected from CORESET #n can indicate one QCL assumption entry from the configured set {QCL_ID$_1$, QCL_ID$_2$, QCL_ID$_3$, . . . , QCL_ID$_M$} and the indicated QCL assumption entry can be used by the UE and the UE may assume the DM-RS associated with PDCCH detection in CORESET #n may be QCLed to the reference signals contained in the indicated QCL assumption entry.

In one example, a DCI format X1 can contain one or more pairs of bit-fields {bit field of CORESET ID indicator, bit-field of PDCCH QCL indicator}, where a bit-field CORESET ID indicator indicates the ID of one CORESET and the corresponding bit-field PDCCH QCL indicator indicates the selected QCL assumption entry from the configured set {QCL_ID$_1$, QCL_ID$_2$, QCL_ID$_3$, . . . , QCL_ID$_M$} for the corresponding CORESET.

The DCI format X1 can contain the information: a CORESET ID indicator 1, a PDCCH QCL indicator 1, a CORESET ID indicator 2, a PDCCH QCL indicator 2, . . . , where a bit-field PDCCH QCL indicator m (m=1, 2, . . . , ) indicates the selection of QCL assumption entry as the QCL assumption for the CORESET indicated by bit-field CORESET ID indicator m.

In one example, a DCI format X1 can contain the following information: a PDCCH QCL indicator 1, a PDCCH QCL indicator 2, a PDCCH QCL indicator 3, . . . where: the PDCCH QCL indicator 1 indicates the selection of QCL assumption entry as the QCL assumption for one configured CORESET with lowest CORESET ID in one CC or BWP; the PDCCH QCL indicator 2 indicates the selection of QCL assumption entry as the QCL assumption for one configured CORESET with second lowest CORESET ID in one CC or BWP; and the PDCCH QCL indicator 3 indicate the selection of QCL assumption entry as the QCL assumption for one configured CORESET with third lowest CORESET ID in one CC or BWP, . . . .

In one example, a UE can be configured with a first set of RS IDs $S_1=\{RS_{a1}, RS_{a2}, . . . , RS_{aN1}\}$ in which N1 RS IDs are configured and a second set of RS IDs: $S_2=\{RS_{b1}, RS_{b2}, . . . , RS_{bN2}\}$ in which N2 RS IDs are configured. The RS IDs configured in a first set $S_1$ and a second set $S_2$ are used to provide source of some QCL types for PDCCH transmission. Downlink signaling (for example one DCI format) can be used to indicate on RS ID from a first set and one RS ID from a second set for the PDCCH transmission and the UE may assume the DM-RS for reception of PDCCH is QCLed to the RS IDs indicated by, for example, one DCI format.

In one example, the RS IDs configured in a first set $S_1$ are source of QCL type D for PDCCH in one CC or BWP and the RS IDs configured in a second set $S_2$ are source of QCL type A for PDCCH in one CC or BWP. Then one DCI format X2 can be used to indicate one bit-field PDCCH QCL indicator-1 to indicate one RS ID in a first set $S_1$ and one bit-field PDCCH QCL indicator-2 to indicate one RS ID in a second set $S_2$ as the sources for QCL assumption for PDCCH.

The UE may assume the DM-RS for PDCCH reception may QCLed to RS ID indicated by a bit-field PDCCH QCL indicator-1 with respect to QCL type D (i.e., the Rx beam information or spatial Rx parameter) and QCLed to RS ID indicated by bit-field PDCCH QCL indicator-2 with respect to QCL type A. The bit-length of bit-field PDCCH QCL indicator-1 can be $\lceil \log_2 N1 \rceil$ where N1 is the number of RS IDs in a first set $S_1$ and the bit-length of bit-field PDCCH QCL indicator-2 can be $\lceil \log_2 N2 \rceil$ where N2 is the number of RS IDs in a second set $S_2$.

In one example, one bit-field PDCCH QCL indicator can be used to indicate two RS IDs: one RS ID in a first set $S_1$ and one RS ID in a second set $S_2$. It may be assumed that the bit-field PDCCH QCL indicator has L bits and the LSB (least significant bit) $L_1$ bits can be used to indicate one RS ID in a first set $S_1$ and the other bits in bit-field PDCCH QCL indicator are used to indicate one RS ID in a second set $S_2$. The number bits in bit-field PDCCH QCL indicator can be $\lceil \log_e N2 \rceil + \lceil \log_2 N1 \rceil$ where N1 and N2 are the number of RS IDs in a first set $S_1$ and a second set $S_2$, respectively.

In one example, one bit-field PDCCH QCL indicator can be used to indicate two RS IDs: one RS ID in a first set $S_1$ and one RS ID in a second set $S_2$. Each value of bit-field PDCCH QCL indicator can indicate the selection of one RS ID in a first set and one RS ID in a second set. The number bits in bit-field PDCCH QCL indicator can be $\lceil \log_2 (N2 \times N1) \rceil$ where N1 and N2 are the number of RS IDs in a first set $S_1$ and a second set $S_2$, respectively. In an example of N1=4 and N2=2, the value of bit-field PDCCH QCL indicator can be in the following TABLE 1.

TABLE 1

Indicator mapped to Index and selection of RS IDs

| Bit field of PDCCH QCL indicator mapped to index | Selection of RS IDs |
| --- | --- |
| 0 | $\{RS_{a1}, RS_{b1}\}$ |
| 1 | $\{RS_{a1}, RS_{b2}\}$ |
| 2 | $\{RS_{a2}, RS_{b1}\}$ |
| 3 | $\{RS_{a2}, RS_{b2}\}$ |
| 4 | $\{RS_{a3}, RS_{b1}\}$ |
| 5 | $\{RS_{a3}, RS_{b2}\}$ |
| 6 | $\{RS_{a4}, RS_{b1}\}$ |
| 7 | $\{RS_{a4}, RS_{b2}\}$ |

The benefit for the aforementioned example is the number of bits for bit-field PDCCH QCL indicator is reduced.

In one example, the RS IDs configured in a first set $S_1$ are source of QCL type D for PDCCH in one CC or BWP and the RS IDs configured in a second set $S_2$ are source of QCL type A for PDCCH in one CC or BWP. Then one DCI format X2 can be used to indicate one or more bit-field(s) to indicate one RS ID in a first set $S_1$ and one RS ID in a second set $S_2$ as the QCL assumption for the UE to receive PDCCH transmission. Then The UE may assume the DM-RS for PDCCH reception may QCLed to RS ID selected from a first set $S_1$ with respect to QCL type D (i.e, the Rx beam information or spatial Rx parameter) and QCLed to RS ID selected from a second set $S_2$ with respect to QCL type A. There may be the following alternatives.

In one example, a bit-field PDCCH QCL indicator in a DCI format Y1 detected in PDCCH that is monitored in search space(s) associated with CORESET (control resource set) #n can be used to indicate one RS ID in a first set $S_1$ and one RS ID in a second set $S_2$ as the QCL assumption for the CORESET #n. Then the UE may assume the DM-RS associated with the reception of PDCCH monitored in search space associated with CORESET #n to be QCLed with RS ID in a first set $S_1$ with respect to QCL type D and QCLed with RS ID in a first set $S_2$ with respect to QCL type A, as indicated by bit-field PDCCH QCL indicator.

In one example, one bit-field PDCCH QCL indicator-1 and one bit-field PDCCH QCL indicator-2 in a DCI format Y1 detected in PDCCH that is monitored in search space(s) associated with CORESET (control resource set) #n can be used to indicate one RS ID in a first set $S_1$ and one RS ID in a second set $S_2$, respectively, as the QCL assumption for the CORESET #n. Then the UE may assume the DM-RS associated with the reception of PDCCH monitored in search space associated with CORESET #n to be QCLed with RS ID (indicated by bit-field PDCCH QCL indicator-1) in a first set $S_1$ with respect to QCL type D and QCLed with RS ID (indicated by bit-field PDCCH QCL indicator-1) in a first set $S_2$ with respect to QCL type A.

In one example, a DCI format Y1 can contain one or more pairs of bit-fields {bit field of CORESET ID indicator, bit-field of PDCCH QCL indicator}, where the bit-field CORESET ID indicator indicates the ID of one CORESET and the corresponding bit-field PDCCH QCL indicator indicates one RS ID selected in a first set $S_1$ and one RS ID selected in a second set $S_2$.

The DCI format Y1 can contain the information: a CORESET ID indicator 1, a PDCCH QCL indicator 1, a CORESET ID indicator 2, a PDCCH QCL indicator 2, . . . , where the bit-field PDCCH QCL indicator m (m=1, 2, . . . , ) indicate the selection of one RS ID in a first set $S_1$ and one RS ID in a second set $S_2$ as the source of QCL configuration for the CORESET indicated by bit-field CORESET ID indicator m.

In one example, a DCI format Y1 can contain one or more entries of bit-fields {bit field of CORESET ID indicator, a bit-field of PDCCH QCL indicator-a, a bit-field of PDCCH QCL indicator-b}, and the DCI format Y1 can contain the information: a CORESET ID indicator 1, a PDCCH QCL indicator-a 1, a PDCCH QCL indicator-b 1, a CORESET ID indicator 2, a PDCCH QCL indicator-a 2, a PDCCH QCL indicator-b 2 . . . , . where the bit-field PDCCH QCL indicator-a m (m=1, 2, . . . , ) indicates the selection of one RS ID in a first set $S_1$ as the QCL source for QCL type D and the bit-field PDCCH QCL indicator-b m (m=1, 2, . . . ) indicates one RS ID in a second set $S_2$ as the QCL source for QCL type A for the CORESET indicated by the bit-field CORESET ID indicator m.

In one example, a DCI format Y1 can contain the following information: a PDCCH QCL indicator-a 1, a PDCCH QCL indicator-b 1, a PDCCH QCL indicator-a 2, a PDCCH QCL indicator-b 2, a PDCCH QCL indicator-a 3, a PDCCH QCL indicator-b 3, . . . , where the PDCCH QCL indicator-a 1 indicates the one RS ID selected in a first set $S_1$ as the QCL source for QCL type D and the bit-field PDCCH QCL indicator-b 1 indicates one RS ID in a second set $S_2$ as the QCL source for QCL type A for the CORESET with the lowest ID in one CC or BWP; the PDCCH QCL indicator-a 2 indicates the one RS ID selected in a first set $S_1$ as the QCL source for QCL type D and the bit-field PDCCH QCL indicator-b 2 indicates one RS ID in a second set $S_2$ as the QCL source for QCL type A for the CORESET with the second lowest ID in one CC or BWP; the PDCCH QCL indicator-a 3 indicates the one RS ID selected in a first set $S_1$ as the QCL source for QCL type D and the bit-field PDCCH QCL indicator-b 3 indicates one RS ID in a second set $S_2$ as the QCL source for QCL type A for the CORESET with the third lowest ID in one CC or BWP In one embodiment, the aforementioned embodiments and examples may be applied to a PDSCH channel with straightforward derivation.

In NR phase 1, both DCI formats 0_0 and 0_1 can be used to schedule an uplink PUSCH transmission. A DCI format 0_1 can schedule either a codebook-based or non-codebook-based PUSCH transmission and the SRI (SRS resource indicator) field in the DCI format 0_1 is used to indicate the information of "Tx beam" for one scheduled PUSCH transmission.

A DCI format 0_0 can schedule a PUSCH transmission and that PUSCH transmission may use the same Tx beam as one of the active PUCCH channels in the same carrier. In particular, that PUCCH resource is the PUCCH with lowest resource index among all active PUCCH resources.

On the other hand, not all cell can have PUCCH channels in an uplink. In a carrier aggregation scenario, all the carriers (including primary cell, Pcell, and secondary cells, SCell) can be divided into one or more PUCCH groups. If there is one PUCCH group, all the PUCCH resources are configured in uplink of Pcell. If there are two PUCCH groups, in the primary PUCCH group, the PUCCH resources are configured in uplink of Pcell and the UCI for all the Scells in the primary PUCCH group may be transmitted in PUCCH resources in an uplink of Pcell. And in a secondary PUCCH group, one cell among all the cells in secondary PUCCH group can be configured with PUCCH resources in the uplink and this cell is called PUCCH-SCell and all the other cells in secondary PUCCH group may send UCI in the PUCCH resources configured in PUCCH-SCell.

Therefore, given the current specification, it may not be able to use a DCI format 0_0 to schedule PUSCH transmission on an SCell without any PUCCH resources being configured. In some case, one SCell may not even have corresponding uplink channel and the SCell in one downlink-only carrier. A DCI format 0_0 has less bit payload than a DCI format 0_1 and so it is very useful for transmission range enhancement. Not supporting the DCI format 0_0 to schedule PUSCH in an SCell would cause big limitation for deployment.

In one embodiment, a DCI format 0_0 can include one bit-field A1 that is used to indicate the Tx beam information (i.e., spatial relation information) for the scheduled PUSCH. Each value of the bit-field A1 can indicate one or more reference signal ID(s) and the UE can be requested to derive the Tx beamformer (can be called spatial domain transmission filter) based on the one or more reference signal ID(s) corresponding to the value of bit-field A1 in one received DCI format 0_0 and then apply the derived Tx beamformer (or called spatial domain transmission filter) to the PUSCH transmission scheduled by the same DCI format 0_0.

Figure 15:
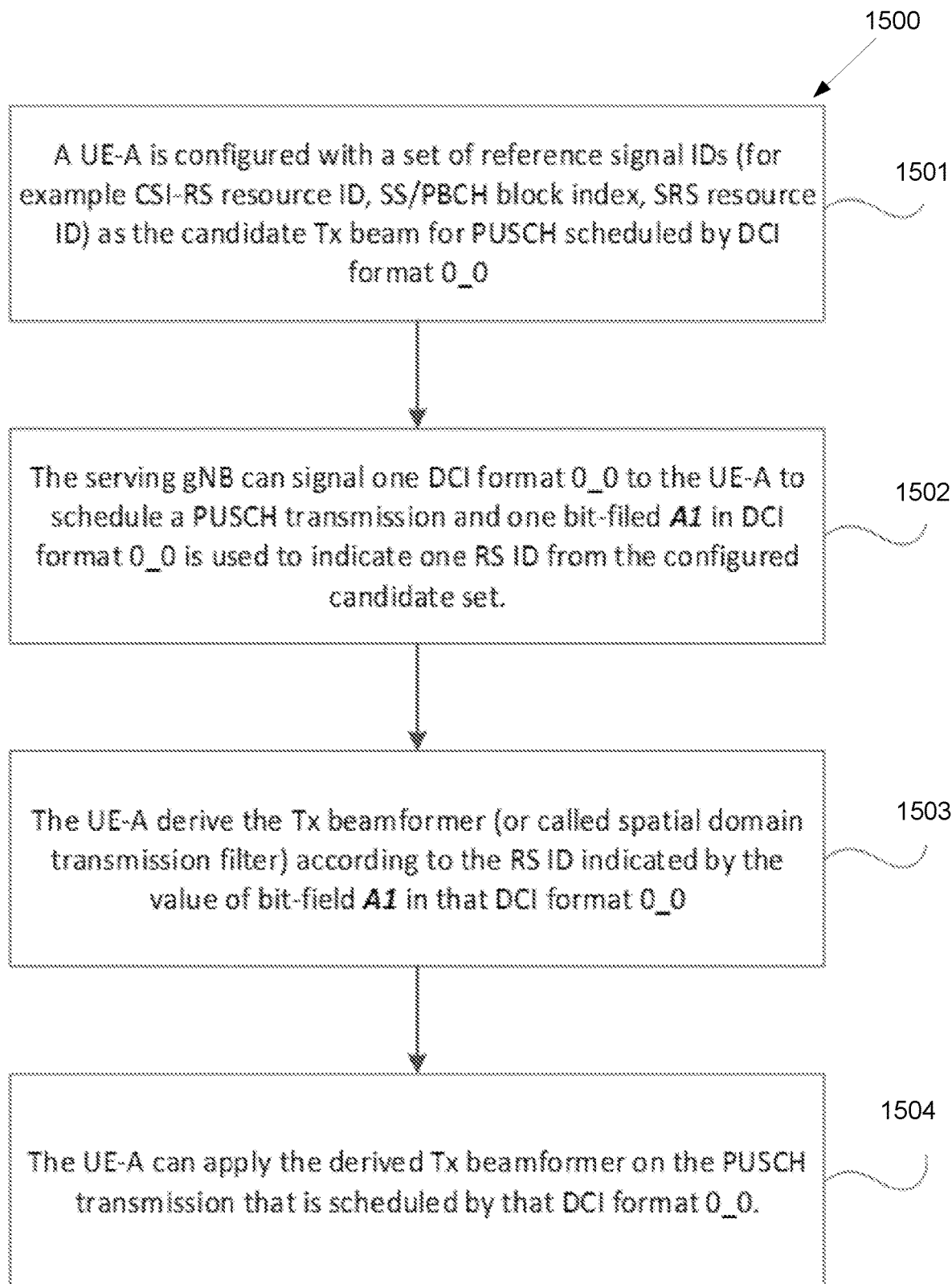
FIG. 15 illustrates a flowchart of a method for Tx beam indication and determination for PUSCH according to embodiments of the present disclosure.

FIG. 15 illustrates a flowchart of a method 1500 for Tx beam indication and determination for PUSCH according to embodiments of the present disclosure. The embodiment of the method 1500 illustrated in FIG. 15 is for illustration only. FIG. 15 does not limit the scope of this disclosure to any particular implementation.

As shown in FIG. 15, a UE-A can be configured with a set of reference signal (RS) ID(s) as the candidate Tx beam for PUSCH transmission scheduled by DCI format 0_0 in step 1501. Those reference signal ID can be CSI-RS (Channel state information reference signal) resource index, SRS (sounding reference signal) resource index and/or SS/PBCH (synchronization signal/physical broadcast channel) block index.

In step 1502, the serving gNB can send a DCI format 0_0 to the UE-A to schedule a PUSCH transmission for the UE-A. In the DCI format 0_0, there can be one bit-field A1 and the value of bit-field A1 can indicate the selection of one RS ID from the set configured in step 1501. Then the UE-A may derive one Tx beamformer for the PUSCH transmission scheduled by DCI format 0_0 in step 1502. The UE-A may use the reference signal ID indicated by the value of bit-field A1 in DCI format 0_0 received in step 1502 to derive the Tx beamformer.

In one example, if a CSI-RS resource index or SS/PBCH block index (that are downlink signals) is indicated by the value of bit-field A1 in DCI format 0_0, the UE-A may apply the spatial domain transmission filter same to the filter used to receive the indicated CSI-RS resource or SS/PBCH block to the PUSCH transmission.

In one example, if an SRS resource index is indicated by the value of bit-field A1 in DCI format 0_0, the UE-A may apply the spatial domain transmission filer same to the filter used to transmit the indicated SRS resource to the PUSCH transmission. After that, the UE-A may transmit the PUSCH with the derived Tx beamformer (or called spatial domain transmission filter).

In one embodiment, a UE can be configured with a first set of RS IDs, e.g., a CSI-RS resource index, a SS/PBCH block index and/or an SRS resource index as the spatial relation candidate for PUSCH scheduled by a DCI format 0_0 in one carrier. That first set of RS IDs can be signaled through a RRC configuration message. That a first set of RS IDs can be signaled through a MAC-CE message. A DCI format 0_0 can include one bit-field, e.g., called a Spatial-Relation Indicator, to indicate one RS ID from the configured a first set of RS IDs and the UE may use the RS ID indicated by the value of a bit-field SpatialRelation Indicator to derive the spatial domain transmission filter for the PUSCH transmission scheduled by that DCI format 0_0.

If a CSI-RS resource index or SS/PBCH block index (that are downlink signals) is indicated by the value of bit-field SpatialRelation Indicator in DCI format 0_0, the UE-A may apply the spatial domain transmission filter same to the filter used to receive the indicated CSI-RS resource or a SS/PBCH block to the PUSCH transmission. In one example, if an SRS resource index is indicated by the value of bit-field Spatial-Relation Indicator in a DCI format 0_0, the UE-A may apply the spatial domain transmission filer same to the filter used to transmit the indicated SRS resource to the PUSCH transmission.

In one example, the bit-width (i.e., the number of bits) of bit-field SpatialRelation Indicator in a DCI format 0_0 sent in one carrier (CC) or BWP (bandwidth part) can depend on the number of RS IDs in a first set of RS IDs configured for that CC or BWP. The number of bits in a bit-field Spatial-Relation Indicator can be $\lceil \log_2 N_{RS} \rceil$ where $N_{RS}$ is the number RS IDs configured in a first set of RS IDs as the spatial relation candidate for PUSCH scheduled by a DCI format 0_0 in that CC or BWP. Examples of the value of $N_{RS}$ can be 1, 2, 3, 4, . . . .

To reduce the latency and also reduce the involvement of RRC layer in the multi-beam operation, which is supposed to be L1/L2 operation, the first set of SRS resource IDs can be signaled in MAC-CE message.

In one example, if a UE is configured with a first set of RS IDs as the spatial relation candidate for PUSCH scheduled by DCI format 0_0 in one carrier or BWP, the DCI format 0_0 may include a bit-field to indicate one RS ID from the configured a first set of RS IDs for the spatial relation candidate and if a UE is not configured with a first set of RS IDs as the spatial relation candidate for PUSCH scheduled by a DCI format 0_0 in one carrier or BWP, the UE may assume to use spatial relation configured to one PUCCH resource in the same carrier or BWP to transmit the PUSCH scheduled by DCI format 0_0.

In one example, a UE can be configured with a first set of spatial relation for PUSCH scheduled by a DCI format 0_0. A first set can contain one or more entries and each entry can contain one or more RS IDs. A DCI format 0_0 can include one bit-field, e.g., called SpatialRelation Indicator, to indicate one entry from the configured a first set of spatial relation and the UE may use the entry of spatial relation indicated by the value of bit-field SpatialRelation Indicator to derive the spatial domain transmission filter for the PUSCH transmission scheduled by that DCI format 0_0.

If the indicated entry of spatial relation contains a CSI-RS resource index or a SS/PBCH block index (that are downlink signals), the UE-A may apply the spatial domain transmission filter same to the filter used to receive the indicated CSI-RS resource or SS/PBCH block to the PUSCH transmission. In one example, if the indicated entry of spatial relation contains an SRS resource index, the UE-A may apply the spatial domain transmission filer same to the filter used to transmit the indicated SRS resource to the PUSCH transmission. If the indicated entry of spatial relation contains more than one RS IDs, the UE derive the spatial domain transmission filter based on all the RS IDs contained in the indicated entry of spatial relation for the PUSCH scheduled by DCI format 0_0.

In one example, a UE can be configured with a first set of SRS resource IDs and the use case for the SRS resource set is set to be used for PUSCH scheduled by a DCI format 0_0. And then a DCI format 0_0 can include one bit-field e.g., called SpatialRelation Indicator to indicate one SRS resource ID from the configured a first set of SRS resource IDs. When the UE receives one DCI format 0_0 to schedule a PUSCH transmission and the value of bit-field SpatialRelation Indicator in that DCI format 0_0 can indicate one SRS resource in the configured a first set of SRS resource IDs.

To transmit the PUSCH schedule by a DCI format 0_0, the UE may apply one spatial domain transmission filter same to the filter use to transmit the SRS resource ID that is indicated by the value of bit-field SpatialRelation Indicator signaled in the corresponding DCI format 0_0. To reduce the latency and also reduce the involvement of RRC layer in the multi-beam operation, which is supposed to be L1/L2 operation, the first set of SRS resource IDs can be signaled in MAC-CE message.

There are various alternatives for configure/indicate Tx beam (or called spatial relation) to PUSCH scheduled by a DCI format 0_0 in an SCell without configured PUCCH resources.

In one example, a gNB can use a higher layer signaling (for example RRC or MAC-CE message) to indicate one or more RS ID (e.g., a CSI-RS ID, an SRS resource ID or an SSB ID) as the Tx beam (or called spatial relation) for PUSCH scheduled by a DCI format 0_0 in a first CC.

In one example, a gNB can use higher layer signaling (for example RRC or MAC-CE message) to indicate a first set of RS IDs as the candidate Tx beam for PUSCH scheduled by a DCI format 0_0 in a first CC. And then one bit-field in one DCI format 0_0 can indicate one RS ID from the a first set of RS ID as the spatial relation for the PUSCH scheduled by that DCI format 0_0 in a first CC.

In one example, for each PUSCH scheduled by a DCI format 0_0, the UE can assume the spatial relation for that PUSCH (i.e., Tx beam for that PUSCH) correspond to the QCL assumption on the PDCCH where that DCI format 0_0 is detected.

In NR specification, the Tx beam information for one PUCCH resource is configured through RRC signaling and then MAC-CE message is used to select one from the pool configured by RRC as the Tx beam for one PUCCH resource. The consequence of such a design is high latency and unnecessary RRC configuration or re-configuration even when one UE is moving within one cell.

In one embodiment, a UE can be configured with a set of spatial relations for a PUCCH channel in one CC or BWP and then one DCI format can be used to dynamically indicate the selection of one spatial relation for PUCCH channel. The UE can be configured with a set of spatial relations and in each entry of spatial relation, there can be one or more reference signal IDs. Those reference signal IDs can be a CSI-RS resource index, an SS/PBCH block index and/or SRS resource index.

The UE can derive the spatial domain transmission filter for PUCCH transmission according to the reference signal ID contained in one entry of spatial relation as indicated by some signaling. In one example, the set of spatial relations for a PUCCH channel can be signaled through one MAC-CE message (e.g., RRC signaling in another example). A DCI format 2_x can be used to select one entry from the spatial relation entries contained in the configured set for the transmission of PUCCH.

In one example, a UE can be configured with a set of RS IDs: $\{RS\_ID^1, RS\_ID_2, RS\_ID_3, \ldots, RS\_ID_N\}$ as the spatial relation info candidate pools for PUCCH transmissions in one CC or BWP. In one example, the set $\{RS\_ID_1, RS\_ID_2, RS\_ID_3, \ldots, RS\_ID_N\}$ can be signaled in one MAC-CE message. Then a DCI format 2_x can be used to select one or more RS IDs from the configured set $\{RS\_ID_1, RS\_ID_2, RS\_ID_3, \ldots, RS\_ID_N\}$ to be used as the spatial relation for PUCCH transmission and the UE may derive the spatial domain transmission filter for PUCCH transmission based on the spatial relation RS ID(s) indicated by the latest DCI format 2_x.

The DCI format 2_x can be with CRC scrambled by a special RNTI, for example SR-PUCCH-RNTI (spatial relation info PUCCH RNTI). The following information can be transmitted by means of the DCI format 2_x with CRC scrambled by, for example, SR-PUCCH-RNTI.

In one example, a DCI format 2_x can include one bit-field PUCCH spatial relation indicator with L1 bits to indicate one RS ID from the configured set $\{RS\_ID_1, RS\_ID_2, RS\_ID_3, \ldots, RS\_ID_N\}$. For any PUCCH transmission in one CC or BWP, the UE may derive the spatial domain transmission filter according to the RS ID indicated by the value of bit-field PUCCH spatial relation indicator in the latest DCI format 2_x. The bit-length (i.e., number of bits) of bit-field PUCCH spatial relation indicator can be $\lceil \log_e N \rceil$ where N is the number of entries configured in the set $\{RS\_ID_1, RS\_ID_2, RS\_ID_3, \ldots, RS\_ID_N\}$.

In one example, a DCI format 2_x can include one or more pairs of bit-fields {bit field of PUCCH resource ID, bit-field of PUCCH spatial relation indicator}, where a bit-field PUCCH resource ID indicates the ID of one PUCCH resource and the corresponding bit-field PUCCH spatial relation indicator indicates the selected RS IDs from the configured set $\{RS\_ID_1, RS\_ID_2, RS\_ID_3, \ldots, RS\_ID_N\}$ for the corresponding PUCCH resource.

The DCI format 2_x can contain the information: a PUCCH resource ID 1, a PUCCH spatial relation indicator 1, a PUCCH resource ID 2, a PUCCH spatial relation indicator 2, . . . , a PUCCH resource ID M, a PUCCH spatial relation indicator M where the bit-field PUCCH spatial relation indicator m (m=1, 2, . . . , M) indicates the selection of RS ID as the spatial relation for the PUCCH resource indicated by bit-field PUCCH resource ID m. The UE may use the RS ID indicated by the bit-field PUCCH spatial relation indicator m to derive the spatial domain transmission filter for the transmission of PUCCH resource ID indicated by bit-field PUCCH resource m.

In one example, a DCI format 2_x can contain the following information: a PUCCH spatial relation indicator 1, a PUCCH spatial relation indicator 2, a PUCCH spatial relation indicator 3, a PUCCH spatial relation indicator 4 where the bit-field PUCCH spatial relation indicator 1 indicates one RS ID from the configured set $\{RS\_ID_1, RS\_ID_2, RS\_ID_3, \ldots, RS\_ID_N\}$ for all the PUCCH resource in a first set of PUCCH resources with pucch-ResourceSetId=0 (i.e., the PUCCH resource configured in a first PUCCH resource set). For the transmission on PUCCH resource in a first set of PUCCH resources with pucch-ResourceSetId=0, the UE may derive the spatial domain transmission filter that is same to the filter use to transmit or receive the RS ID indicated by the bit-field PUCCH spatial relation indicator 1.

In such example, where the bit-field PUCCH spatial relation indicator 2 indicates one RS ID from the configured set $\{RS\_ID_1, RS\_ID_2, RS\_ID_3, \ldots, RS\_ID_N\}$ for all the PUCCH resource in a second set of PUCCH resources with pucch-ResourceSetId=1 (i.e., the PUCCH resource configured in a second PUCCH resource set). For the transmission on PUCCH resource in a first set of PUCCH resources with pucch-ResourceSetId=1, the UE may derive the spatial domain transmission filter that is same to the filter use to transmit or receive the RS ID indicated by the bit-field PUCCH spatial relation indicator 2.

In such example, where the bit-field PUCCH spatial relation indicator 3 indicates one RS ID from the configured set $\{RS\_ID_1, RS\_ID_2, RS\_ID_3, \ldots, RS\_ID_N\}$ for all the PUCCH resource in a third set of PUCCH resources with pucch-ResourceSetId=2 (i.e., the PUCCH resource configured in a third PUCCH resource set). For the transmission on PUCCH resource in a first set of PUCCH resources with pucch-ResourceSetId=2, the UE may derive the spatial domain transmission filter that is same to the filter use to transmit or receive the RS ID indicated by the bit-field PUCCH spatial relation indicator 3.

In such example, where the bit-field PUCCH spatial relation indicator 4 indicates one RS ID from the configured set $\{RS\_ID_1, RS\_ID_2, RS\_ID_3, \ldots, RS\_ID_N\}$ for all the PUCCH resource in a fourth set of PUCCH resources with pucch-ResourceSetId=3 (i.e., the PUCCH resource configured in a fourth PUCCH resource set). For the transmission on PUCCH resource in a first set of PUCCH resources with pucch-ResourceSetId=3, the UE may derive the spatial domain transmission filter that is same to the filter use to transmit or receive the RS ID indicated by the bit-field PUCCH spatial relation indicator 4.

In one example, a UE can be requested to report an ACK/NACK for the reception of one DCI format 2_x that signals the Tx beam indication (or called spatial relation) for PUCCH channels.

Figure 16:
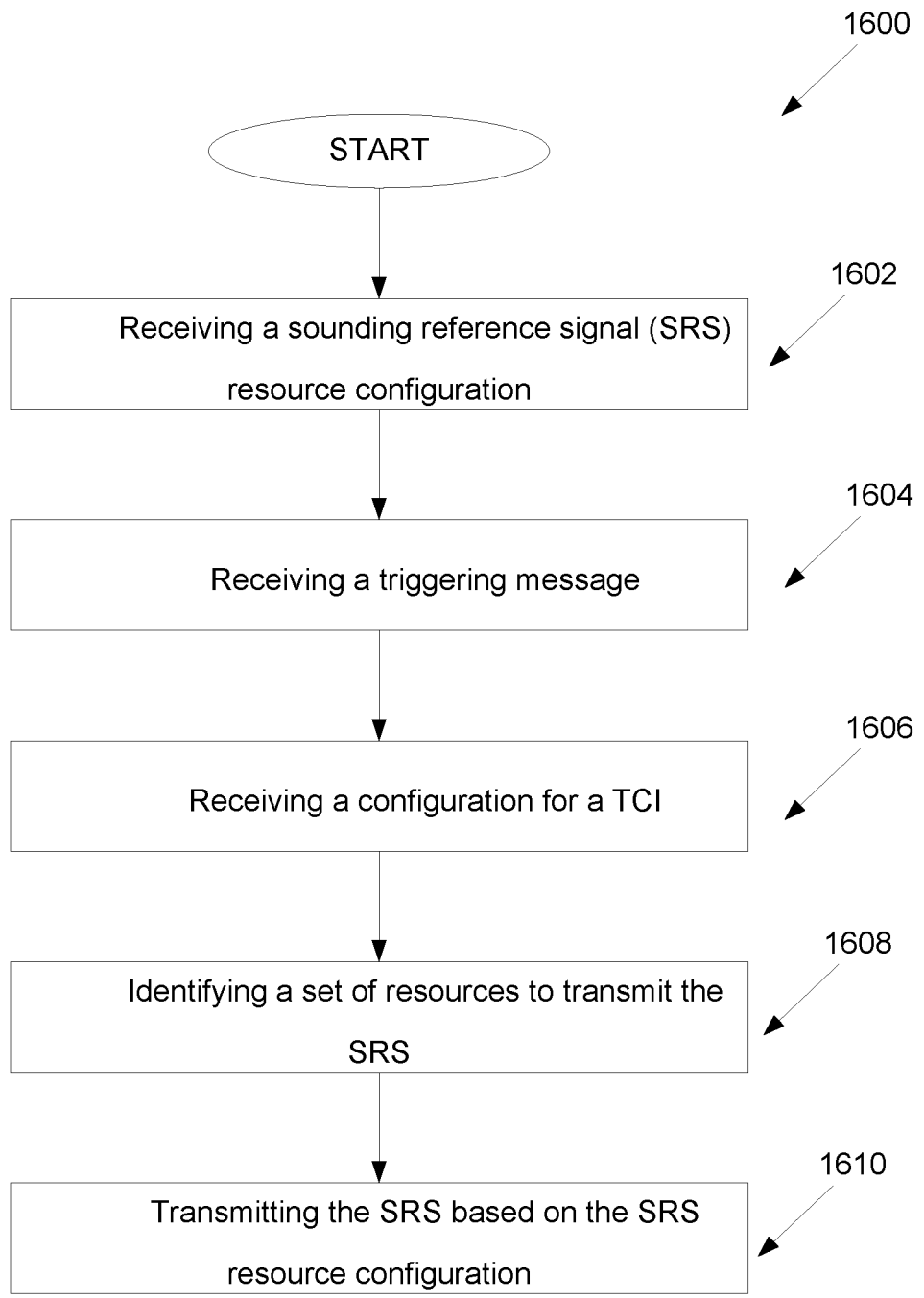
FIG. 16 illustrates a flowchart of a method for multi-beam operation according to embodiments of the present disclosure.

FIG. 16 illustrates a flowchart of a method 1600 for multi-beam operation according to embodiments of the present disclosure, as may be performed by a UE (e.g., 111-116 in FIG. 1). The embodiment of the method 1600 illustrated in FIG. 16 is for illustration only. FIG. 16 does not limit the scope of this disclosure to any particular implementation.

As illustrated in FIG. 16, the method begins at step 1602. In step 1602, the UE receives, from a base station (BS), a sounding reference signal (SRS) resource configuration.

In step 1604, the UE receives, from the BS, a triggering message instructing the UE to transmit an SRS.

In one embodiment, the UE receives, from the BS, an indicator message indicating the TCI state to be used for a downlink reception. In another embodiment, the UE receives, from the BS over a downlink channel, the downlink reception with the indicated TCI state.

In step 1606, the UE receives, from the BS, a configuration for a transmission configuration indicator (TCI) state that includes an identification (ID) indicating the SRS resource configuration. In one embodiment, the TCI state configures a QCL-Type D for the included ID indicating the SRS resource configuration.

In one embodiment, the UE receives, from the BS, the downlink reception with a spatial domain receive filter, wherein the spatial domain receive filter and the spatial domain transmission filter are a same filter.

In step 1608, the UE identifies a set of resources to transmit the SRS. In one embodiment, the QCL-Type D is determined based on the SRS resource configuration.

In step 1610, the UE transmits, to the BS over an uplink channel, the SRS based on the SRS resource configuration with a spatial domain transmission filter.

In one embodiment, the UE receives, from the BS, a physical downlink control channel (PDCCH) including first scheduling information for the SRS over the uplink channel.

In one embodiment, the UE transmits, to the BS, the SRS based on the first scheduling information, the SRS used to identify a pair of beams between the UE and BS.

In one embodiment, the UE receives, from the BS, a PDCCH including second scheduling information for a physical downlink shared channel (PDSCH), and wherein the PDCCH indicates the TCI state as a QCL configuration for the PDSCH.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:
1. A user equipment (UE) for a multi-beam operation in a wireless communication system, the UE comprising:
   a transceiver configured to:
      receive, from a base station (BS), a sounding reference signal (SRS) resource configuration,
      receive, from the BS, a triggering message instructing the UE to transmit an SRS, and
      receive, from the BS, a configuration for a transmission configuration indicator (TCI) state that includes an identification (ID) indicating the SRS resource configuration, wherein the TCI state configures a quasi co-location-Type D (QCL-Type D) for the included ID indicating the SRS resource configuration; and
   a processor operably connected to the transceiver, the processor configured to identify a set of resources to transmit the SRS,
   wherein the transceiver is further configured to transmit, to the BS over an uplink channel, the SRS based on the SRS resource configuration with a spatial domain transmission filter.

2. The UE of claim 1, wherein the transceiver is further configured to:
   receive, from the BS, an indicator message indicating the TCI state to be used for a downlink reception; and
   receive, from the BS over a downlink channel, a downlink transmission with the indicated TCI state.

3. The UE of claim 2, wherein the transceiver is further configured to receive, from the BS, the downlink transmission with a spatial domain receive filter, and wherein the spatial domain receive filter and the spatial domain transmission filter are a same filter.

4. The UE of claim 1, wherein the QCL-Type D indicates information about a transmit beam used to transmit a downlink signal and is determined based on the SRS resource configuration.

5. The UE of claim 1, wherein the transceiver is further configured to:
   receive, from the BS, a physical downlink control channel (PDCCH) including first scheduling information for the SRS over the uplink channel; and transmit, to the BS, the SRS based on the first scheduling information, the SRS used to identify a pair of beams between the UE and BS.

6. The UE of claim 1, wherein the transceiver is further configured to receive a physical downlink control channel (PDCCH) including second scheduling information for a physical downlink shared channel (PDSCH), and wherein the PDCCH indicates the TCI state as a QCL configuration for the PDSCH.

7. A base station (BS) for a multi-beam operation in a wireless communication system, the BS comprising:
   a processor; and
   a transceiver operably connected to the processor, the transceiver configured to:
      transmit, to a user equipment (UE), a sounding reference signal (SRS) resource configuration,
      transmit, to the UE, a triggering message instructing the UE to transmit an SRS,
      transmit, to the UE, a configuration for a transmission configuration indicator (TCI) state that includes an identification (ID) indicating the SRS resource configuration, wherein the TCI state configures a quasi co-location-Type D (QCL-Type D) for the included ID indicating the SRS resource configuration, and
      receive, from the UE over an uplink channel, the SRS based on the SRS resource configuration in which the UE transmits with a spatial domain transmission filter,
   wherein a set of resources is determined to receive the SRS from the UE.

8. The BS of claim 7, wherein the transceiver is further configured to:
   transmit, to the UE, an indicator message indicating the TCI state to be used for a downlink transmission; and
   transmit, to the UE over a downlink channel, the downlink transmission with the indicated TCI state.

9. The BS of claim 8, wherein the transceiver is further configured to transmit, to the UE, the downlink transmission in which the UE receives with a spatial domain receive filter, and wherein the spatial domain receive filter and the spatial domain transmission filter are a same filter.

10. The BS of claim 7, wherein the QCL-Type D indicates information about a transmit beam used to transmit a downlink signal and is determined based on the SRS resource configuration.

11. The BS of claim 7, wherein the transceiver is further configured to:
   transmit, to the UE, a physical downlink control channel (PDCCH) including first scheduling information for the SRS over the uplink channel; and
   receive, from the UE, the SRS based on the first scheduling information, the SRS used to identify a pair of beams between the UE and BS.

12. The BS of claim 7, wherein the transceiver is further configured to transmit a physical downlink control channel (PDCCH) including second scheduling information for a physical downlink shared channel (PDSCH), and wherein the PDCCH indicates the TCI state as a QCL configuration for the PDSCH.

13. A method of a user equipment (UE) for a multi-beam operation in a wireless communication system, the method comprising:
   receiving, from a base station (BS), a sounding reference signal (SRS) resource configuration;
   receiving, from the BS, a triggering message instructing the UE to transmit an SRS;
   receiving, from the BS, a configuration for a transmission configuration indicator (TCI) state that includes an identification (ID) indicating the SRS resource configuration, wherein the TCI state configures a quasi co-location-Type D (QCL-Type D) for the included ID indicating the SRS resource configuration;
   identifying a set of resources to transmit the SRS; and
   transmitting, to the BS over an uplink channel, the SRS based on the SRS resource configuration with a spatial domain transmission filter.

14. The method of claim 13, further comprising:
   receiving, from the BS, an indicator message indicating the TCI state to be used for a downlink reception; and
   receiving, from the BS over a downlink channel, a downlink transmission with the indicated TCI state.

15. The method of claim 14, further comprising receiving, from the BS, the downlink transmission with a spatial domain receive filter, wherein the spatial domain receive filter and the spatial domain transmission filter are a same filter.

16. The method of claim 13, wherein the QCL-Type D indicates information about a transmit beam used to transmit a downlink signal and is determined based on the SRS resource configuration.

17. The method of claim 13, further comprising:
   receiving, from the BS, a physical downlink control channel (PDCCH) including first scheduling information for the SRS over the uplink channel;
   transmitting, to the BS, the SRS based on the first scheduling information, the SRS used to identify a pair of beams between the UE and BS; and
receiving, from the BS, a PDCCH including second scheduling information for a physical downlink shared channel (PDSCH), and wherein the PDCCH indicates the TCI state as a QCL configuration for the PDSCH.

* * * * *